US008421848B2

(12) United States Patent
Watabu et al.

(10) Patent No.: US 8,421,848 B2
(45) Date of Patent: Apr. 16, 2013

(54) STEREOSCOPIC VIDEO VIEWING LIMITER AND LIMITATION METHOD, STEREOSCOPIC VIDEO VIEWING LIMITATION NOTIFYING DEVICE AND METHOD, VIDEO VIEWING APPARATUS AND METHOD, AND VIDEO VIEWING SYSTEM

(75) Inventors: Kazuyoshi Watabu, Tokyo (JP); Masaaki Shimada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 339 days.

(21) Appl. No.: 12/951,998

(22) Filed: Nov. 22, 2010

(65) Prior Publication Data

US 2011/0141248 A1   Jun. 16, 2011

(30) Foreign Application Priority Data

Dec. 11, 2009 (JP) ................................. 2009-281855
Jul. 30, 2010 (JP) ................................. 2010-172575

(51) Int. Cl.
    *H04N 13/04* (2006.01)
(52) U.S. Cl.
    USPC ........................................................... 348/42
(58) Field of Classification Search .................... 348/52, 348/56
    See application file for complete search history.

(56) References Cited

U.S. PATENT DOCUMENTS 6,614,927 B1   9/2003   Tabata

2002/0167531 A1*  11/2002  Baudisch ...................... 345/611
2005/0099637 A1*   5/2005  Kacyra et al. ................. 356/601

FOREIGN PATENT DOCUMENTS

| JP | 11-355808 | 12/1999 |
| JP | 2002-010300 | 1/2002 |
| JP | 2004-165708 A | 6/2004 |
| JP | 2006-270924 A | 10/2006 |
| JP | 2009-135686 A | 6/2009 |

* cited by examiner

*Primary Examiner* — David Czekaj
*Assistant Examiner* — Tracy Li
(74) *Attorney, Agent, or Firm* — Birch, Stewart, Kolasch & Birch, LLP

(57) ABSTRACT

A stereoscopic video viewing limiter extracts factor information related to different factors affecting a viewer of a stereoscopic video display from a video signal, generates corresponding effect coefficients representing the degree of effect on the viewer, integrates the effect coefficients as the viewer watches the stereoscopic video image, compares the integrated values with respective thresholds determined according to the viewer's tolerances for each of the factors, and generates a viewing limitation signal when the tolerances are exceeded. The viewing limitation signal is used to limit viewing to a two-dimensional video image instead of the stereoscopic video image. When several viewers watch the same stereoscopic video display, separate viewing limitation signals are generated, tailored to the viewers' individual stereoscopic viewing tolerances, permitting each viewer to enjoy the stereoscopic video display as long as possible without adverse effects.

19 Claims, 31 Drawing Sheets

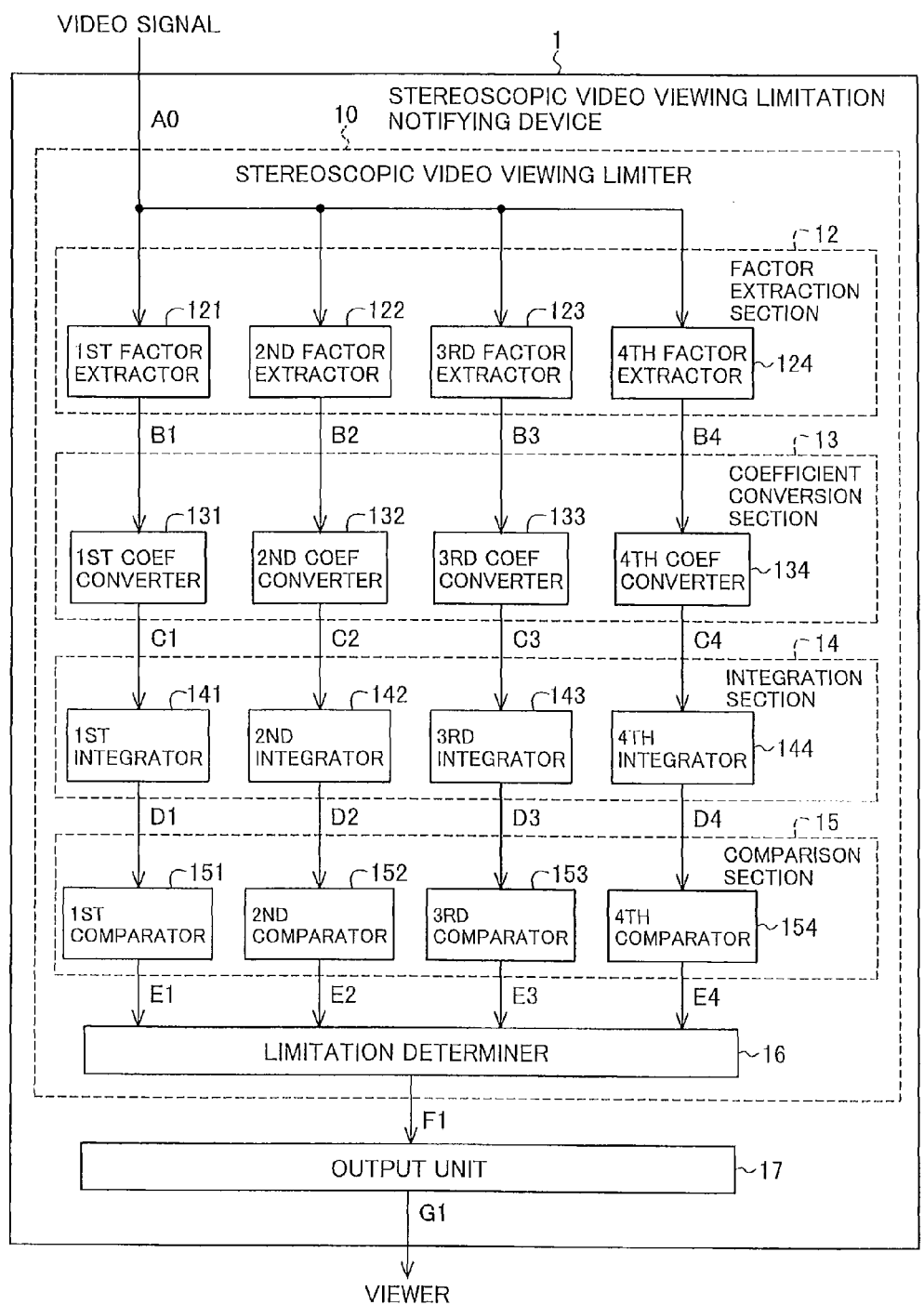

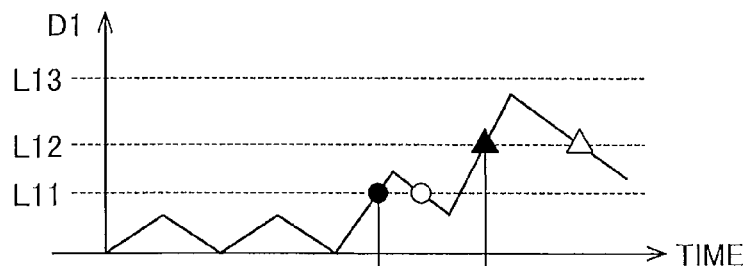
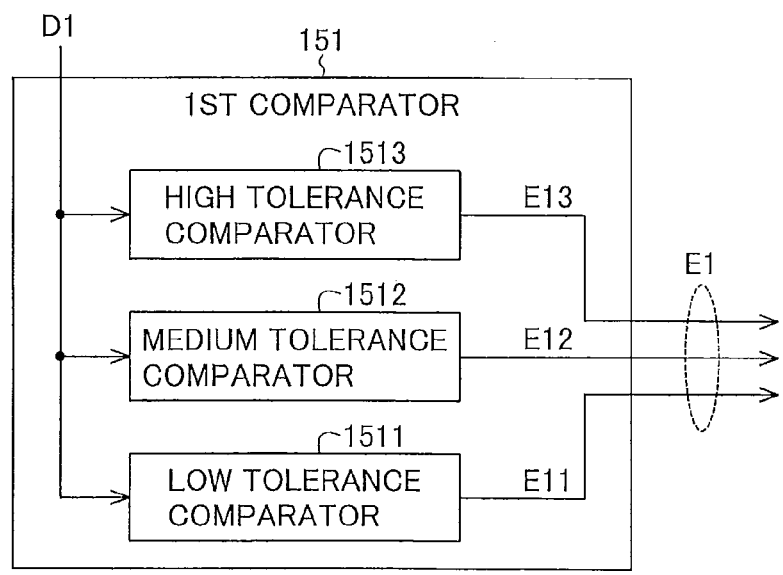

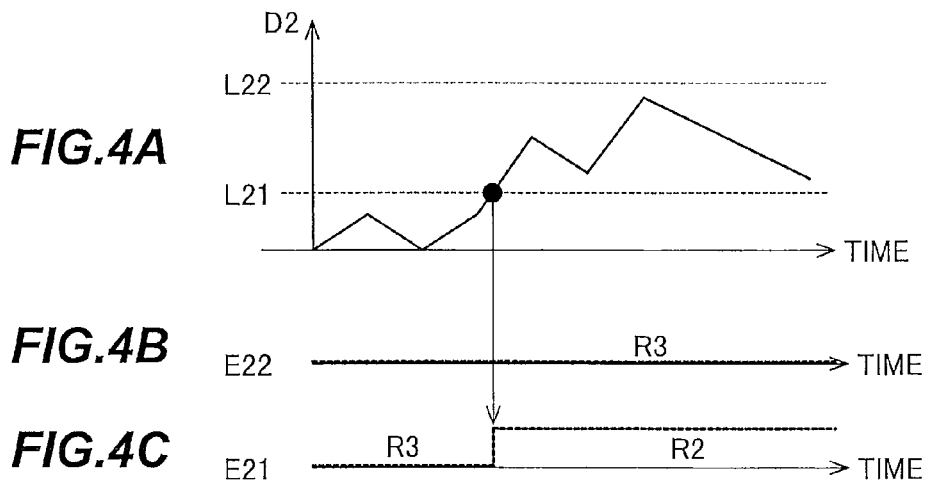
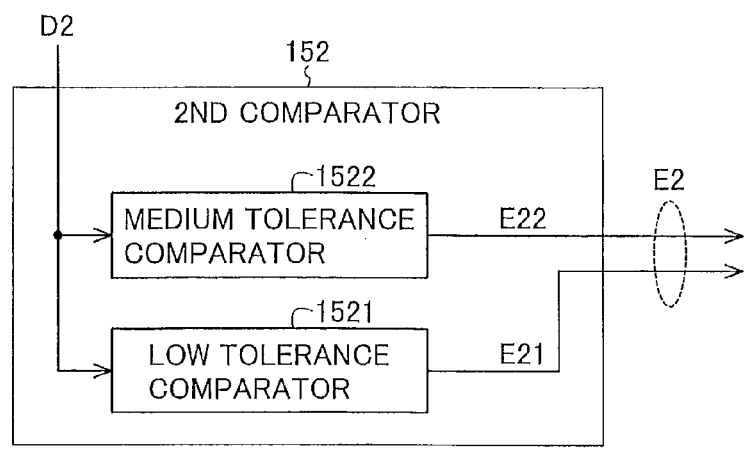

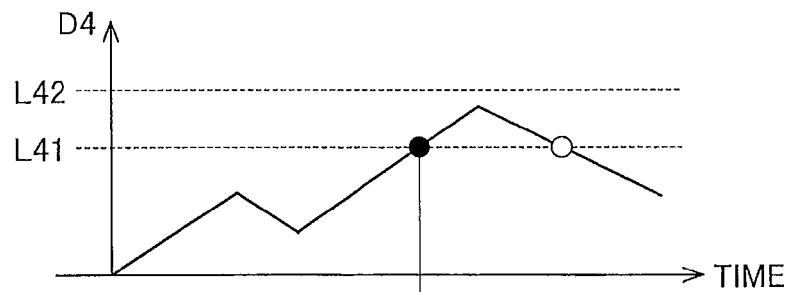
FIG.8A
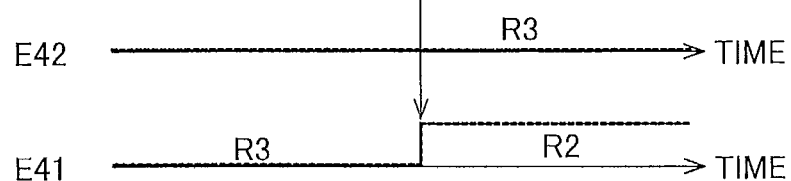
FIG.8B
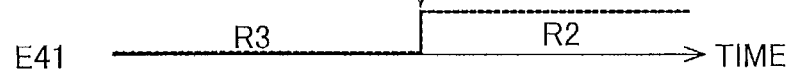
FIG.8C
FIG.9
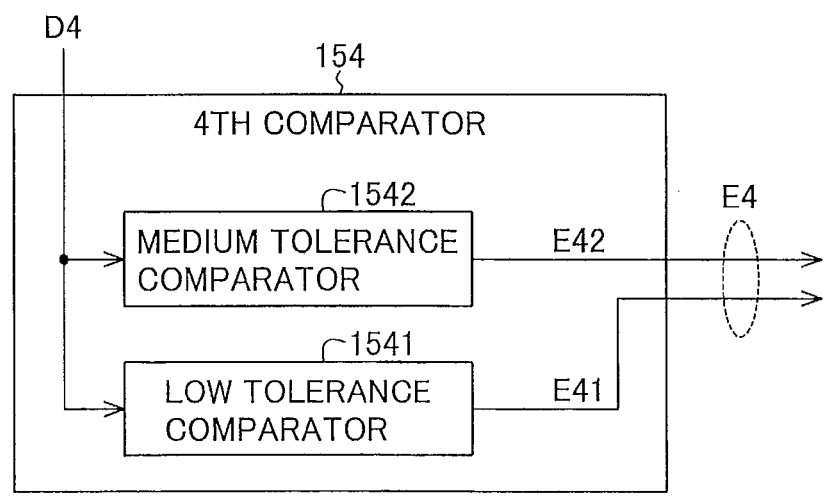

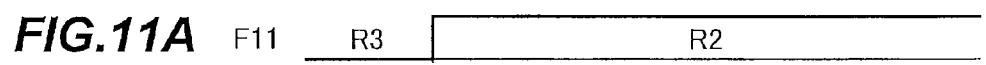
FIG.11A F11
FIG.11B F12
FIG.11C F13
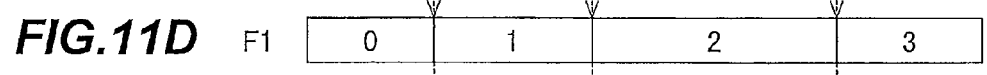
FIG.11D F1
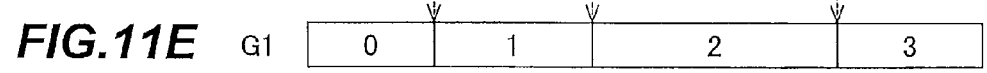
FIG.11E G1

FIG.13A A0 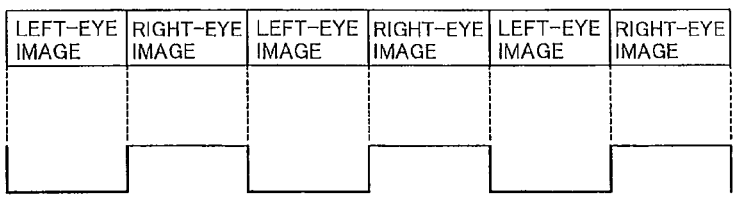
FIG.13B H0 
FIG.14A F11 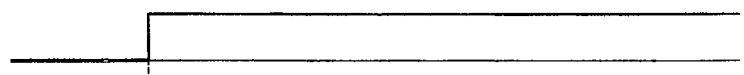
FIG.14B F12 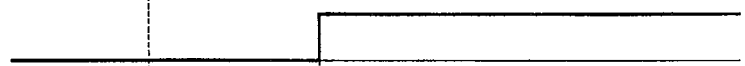
FIG.14C F13 
FIG.14D F1 
FIG.14E G2 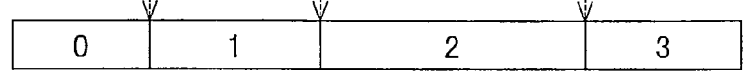

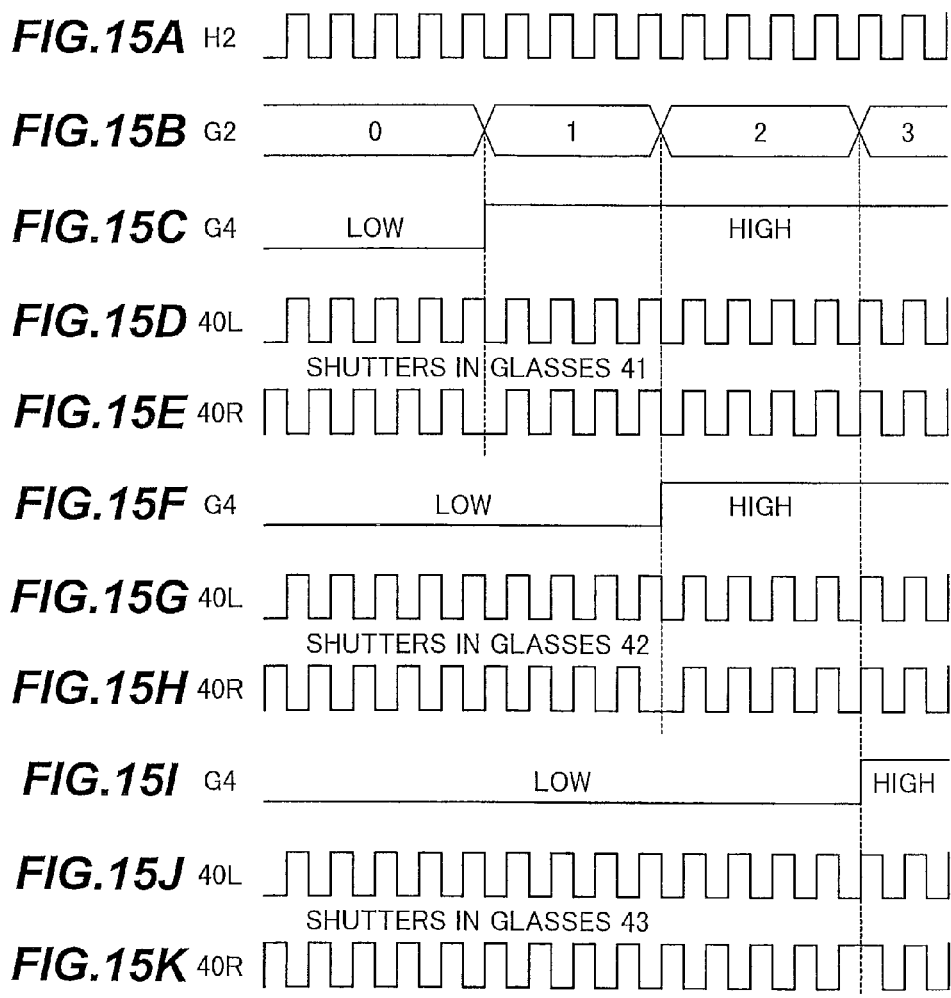

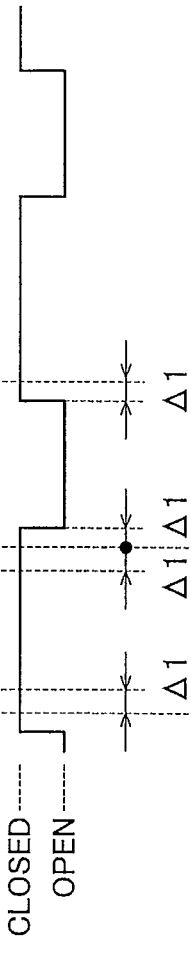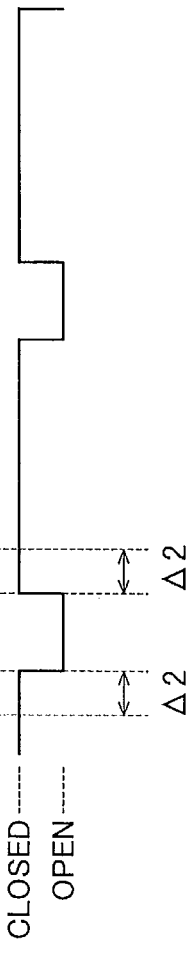

STEREOSCOPIC VIDEO VIEWING LIMITER AND LIMITATION METHOD, STEREOSCOPIC VIDEO VIEWING LIMITATION NOTIFYING DEVICE AND METHOD, VIDEO VIEWING APPARATUS AND METHOD, AND VIDEO VIEWING SYSTEM

BACKGROUND OF THE INVENTION

1. Field of the Invention

The present invention relates to a stereoscopic video viewing limiter and limitation method, a stereoscopic video viewing limitation notifying device and method, a video viewing apparatus and method, and a video viewing system. In particular, the invention relates to apparatus and methods for limiting stereoscopic video viewing in such a way that a plurality of viewers who watch the same stereoscopic video display simultaneously can do so according to their individual stereoscopic viewing tolerances.

2. Description of the Related Art

A stereoscopic video viewing environment in which a stereoscopic effect is created by alternate display of right-eye and left-eye images with parallax on a two-dimensional screen is known to produce fatigue, unease, or motion sickness in some viewers. There is also concern about the effects of stereoscopic video on children's physiological development.

Addressing these problems, Japanese Patent Application Publication No. 2006-270924 (paras. 0071 to 0085) discloses a method for numerizing the effects of different factors on the viewer and reducing the resolution of parts of the video display or skipping parts of the video display as necessary to avoid adverse effects.

Japanese Patent Application Publication No. 2004-165708 (paras. 0056 to 0069) discloses a method of switching from stereoscopic video display to two-dimensional video display when a situation that may have significant effects on the viewer persists for an extended time.

Japanese Patent Application Publication No. 2009-135686 (paras. 0056 to 0069) discloses a method of processing a stereoscopic video image so as to reduce the effects on the viewer to a tolerable level and recording the processed video on a recording medium.

When stereoscopic video content is viewed by a plurality of people simultaneously, the above disclosures provide the same stereoscopic video image to all the viewers. The problem with these methods is that they force all viewers to accept a level of stereoscopic effect suited for the viewer with the lowest stereoscopic tolerance level.

SUMMARY OF THE INVENTION

An object of the present invention is to enable a plurality of viewers to watch identical video content simultaneously according to their individual stereoscopic viewing tolerances.

The invention provides a stereoscopic video viewing limiter for use in a video viewing apparatus that permits stereoscopic video viewing by alternate display of a right-eye image and a left-eye image with parallax. The stereoscopic video viewing limiter includes:

a factor extraction section for extracting factor information related to a plurality of factors affecting a viewer of a stereoscopic video image from a video signal representing the stereoscopic video image;

a coefficient conversion section for generating effect coefficients representing a degree of effect on the viewer from the factor information extracted by the factor extraction section;

an integration section for generating integrated values by integrating the effect coefficients over a period of time during which the user watches the stereoscopic video image;

a comparison section for comparing the integrated values with respective thresholds predetermined according to the viewer's tolerances for each of the plurality of factors and generating effect signals indicating that the integrated values have exceeded the thresholds; and a limitation determiner for generating viewing limitation signals from the effect signals according to the viewer's tolerances, the viewing limitation signals indicating a limitation of viewing to a two-dimensional video image and a cessation of viewing of the stereoscopic video image.

When a plurality of viewers watch a stereoscopic video display simultaneously, stereoscopic viewing or two-dimensional viewing can be selected appropriately according to each viewer's tolerance for stereoscopic video viewing.

BRIEF DESCRIPTION OF THE DRAWINGS

In the attached drawings:

FIG. 1 is a block diagram of a stereoscopic video viewing limitation notifying device according to a first embodiment of the invention;

FIGS. 2A to 2D illustrate the operation of the first coefficient converter, first integrator, and first comparator in FIG. 1;

FIG. 3 is a block diagram showing the internal structure of the first comparator in FIG. 1;

FIGS. 4A to 4C illustrate the operation of the second coefficient converter, second integrator, and second comparator in FIG. 1;

FIG. 5 is a block diagram showing the internal structure of the second comparator in FIG. 1;

FIGS. 8A to 8C illustrate the operation of the fourth coefficient converter, fourth integrator, and fourth comparator in FIG. 1;

FIG. 9 is a block diagram showing the internal structure of the fourth comparator in FIG. 1;

FIGS. 11A to 11E illustrate the operation of the output unit in FIG. 1;

FIGS. 13A and 13B illustrate the frame signal generated in correspondence to the video signal in the video viewing apparatus in the second embodiment;

FIGS. 14A to 4E illustrate the glasses control signals generated in the second embodiment;

FIGS. 15A to 15K illustrate the operation of the glasses in the second embodiment;

FIGS. 26A to 26E illustrate the operation of the shutters of the glasses in an eighth embodiment of the invention;

DETAILED DESCRIPTION OF THE INVENTION

Figure 6A:
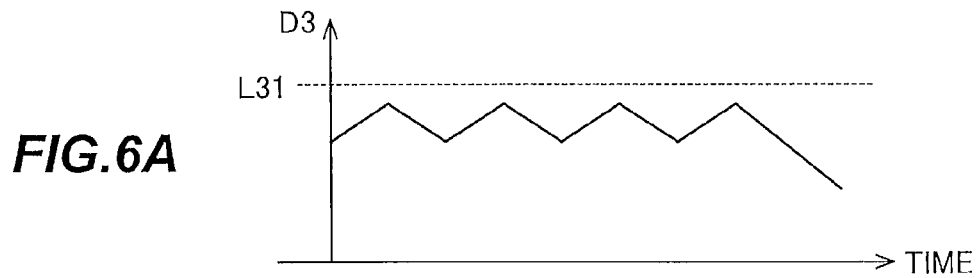
FIGS. 6A and 6B illustrate the operation of the third coefficient converter, third integrator, and third comparator in FIG. 1.

Embodiments of the invention will now be described with reference to the attached drawings, in which like elements are indicated by like reference characters. In these embodiments, in which a stereoscopic effect is created by alternate display of right-eye and left-eye images to the respective eyes, the four factors listed in Table 1 are considered to affect the viewer

TABLE 1

| Factors affecting stereoscopic video viewing tolerance | |
|---|---|
| 1st factor | Rapidly blinking bright points |
| 2nd factor | Broad areas of high contrast |
| 3rd factor | Large difference in brightness between left-eye and right-eye images |
| 4th factor | Large stereoscopic vergence angle |

First Embodiment

Referring to FIG. 1, the stereoscopic video viewing limitation notifying device in the first embodiment includes a factor extraction section 12, a coefficient conversion section 13, a integration section 14, a comparison section 15, and a limitation determiner 16. The factor extraction section 12 includes first to fourth factor extractors 121-124, the coefficient conversion section 13 includes first to fourth coefficient (coef) converters 131-134, the integration section 14 includes first to fourth integrators 141-144, and the comparison section 15 includes first to fourth comparators 151-154. The stereoscopic video viewing limitation notifying device 1 also includes an output unit 17.

A video signal A0 representing left-eye and right-eye video images for a stereoscopic video display is supplied to the first to fourth factor extractors 121-124 in the factor extraction section 12.

The first factor extractor 121 extracts information related to the effect of rapidly blinking bright points.

The second factor extractor 122 extracts information related to the effect of broad areas of high contrast.

The third factor extractor 122 extracts information related to the effect of a large brightness difference between the left-eye and right-eye images.

The fourth factor extractor 124 extracts information related to the effect of a large stereoscopic vergence angle.

The first factor extractor 121 in FIG. 1 extracts the frequency at which the brightness of the brightest point in the video signal A0 goes below and above a predetermined level, generates first factor information B1 with eight levels from level 0 to level 7 as shown in Table 2, indicating that a high frequency is a factor affecting the viewer, and outputs the first factor information B1 to the first coefficient converter 131 in FIG. 1. Although the first factor information B1 has eight levels in the first embodiment, this is not a restriction; the number of levels may be more than eight or less than eight.

TABLE 2

| First factor information | |
|---|---|
| Frequency Fy (Hz) | Level |
| Fy = 0 | 0 |
| 0 ≦ Fy < 3 | 1 |
| 3 ≦ Fy < 6 | 2 |
| 6 ≦ Fy < 9 | 3 |
| 9 ≦ Fy < 12 | 4 |
| 12 ≦ Fy < 15 | 5 |
| 15 ≦ Fy < 18 | 6 |
| 18 ≦ Fy | 7 |

On the basis of the first factor information B1, the first coefficient converter 131 generates a first effect coefficient C1 indicating the degree of effect on the viewer in a predetermined unit time and outputs this coefficient C1 to the first integrator 141. A larger value of C1 indicates a greater effect on the viewer, and a smaller value indicates a lesser effect. A positive value means that an effect is present. If there is no effect, the value becomes negative, indicating that the effect on the viewer is expected to decay over time. The first effect coefficient C1 corresponds to the slope of the line in the graph in FIG. 2A and can be generated by logic circuits or a lookup table (LUT).

The first integrator 141 in FIG. 1 generates a first integrated value D1 by integrating the first effect coefficient C1 over the unit time and outputs this value D1 to the first comparator 151. The first integrated value D1 is represented by the line in the graph in FIG. 2A.

The first comparator 151 includes a low tolerance comparator 1511, a medium tolerance comparator 1512, and a high tolerance comparator 1513, as shown in FIG. 3.

The low tolerance comparator 1511 stores a low tolerance threshold L11, indicated in FIG. 2A. If the first integrated value D1 exceeds this low tolerance threshold L11 (as at the black circle in FIG. 2A), a signal E11 (FIG. 2D) in a first effect signal group E1 is output to switch from a state R3, in which stereoscopic video viewing is allowed, to a state R2, in which two-dimensional video viewing is recommended. This low tolerance threshold L11 is placed at a level such that when the low tolerance threshold L11 is exceeded, the video image would presumably affect viewers with low levels of tolerance to rapidly blinking bright points.

The low tolerance comparator 1511 has a hysteresis function: once it has switched to the state R2 in which two-dimensional viewing is recommended, even if the first integrated value D1 falls below the low tolerance threshold L11 (as at the white circle in FIG. 2A), no recovery to the state R3 in which stereoscopic video viewing is allowed takes place until video viewing is stopped or ends.

The medium tolerance comparator 1512 stores a medium tolerance threshold L12, indicated in FIG. 2A. If the first integrated value D1 exceeds this medium tolerance threshold L12 (as at the black triangle in FIG. 2A), a signal E12 (FIG. 2C) in the first effect signal group E1 is output to switch from the state R3 that allows stereoscopic video viewing to the state R2 that recommends two-dimensional viewing. The medium tolerance threshold L12 is placed at a level such that when the threshold L12 is exceeded, the video image would presumably affect viewers with medium levels of tolerance to rapidly blinking bright points.

The medium tolerance comparator 1512 has a hysteresis function: once it has switched to the state R2 in which two-dimensional viewing is recommended, even if the first integrated value D1 falls below the low tolerance threshold L12 (as at the white triangle in FIG. 2A), no recovery to the state R3 in which stereoscopic video viewing is allowed takes place until video viewing is stopped or ends.

The high tolerance comparator 1513 stores a high tolerance threshold L13, indicated in FIG. 2A. If the first integrated value D1 exceeds this high tolerance threshold L13, a signal E13 (FIG. 2B) in the first effect signal group E1 is output to switch from the state R3 that allows stereoscopic video viewing to the state R2 that recommends two-dimensional viewing. This high tolerance threshold L13 is placed at a level such that when the threshold L13 is exceeded, the video image would presumably affect viewers with high levels of tolerance to rapidly blinking bright points.

The high tolerance comparator 1513 has a hysteresis function; once it has switched to the state R2 in which two-dimensional viewing is recommended, even if the first integrated value D1 falls below the high tolerance threshold L13, no recovery to the state R3 in which stereoscopic video viewing is allowed takes place until video viewing is stopped or ends.

The outputs E11, E12, and E13 of the low, medium, and high tolerance comparators 1511, 1512, 1513 are output to the limitation determiner 16 in FIG. 1 as the first effect signal group E1.

The second factor extractor 122 extracts the ratio of the area with contrast higher than a predetermined value in each frame of the video signal A0 to the whole frame, generates second factor information B2 with eight levels from level 0 to level 7 as shown in Table 3, indicating that in this factor higher ratios have a greater effect on the viewer, and outputs the second factor information B2 to the second coefficient converter 132. Although the second factor information B2 has eight levels in the first embodiment, this is not a restriction; the number of levels may be more than eight or less than eight.

TABLE 3

| Second factor information | |
|---|---|
| Area ratio Ra (%) | Level |
| Ra = 0 | 0 |
| 0 ≦ Ra < 5 | 1 |
| 5 ≦ Ra < 10 | 2 |
| 10 ≦ Ra < 15 | 3 |
| 15 ≦ Ra < 20 | 4 |
| 20 ≦ Ra < 25 | 5 |
| 25 ≦ Ra < 30 | 6 |
| 30 ≦ Ra | 7 |

On the basis of the second factor information B2, the second coefficient converter 132 generates a second effect coefficient C2 indicating the degree of effect on the viewer in a predetermined unit time and outputs this coefficient C2 to the second integrator 142. A larger value of C2 indicates a greater effect on the viewer, and a smaller value indicates a lesser effect. A positive value means that an effect is present. If there is no effect, the value becomes negative, indicating that the effect on the viewer is expected to decay over time. The second effect coefficient C2 corresponds to the slope of the line in the graph in FIG. 4A and can be generated by logic circuits or a lookup table (LUT).

The second integrator 142 in FIG. 1 generates a second integrated value D2 by integrating the second effect coefficient C2 over the unit time and outputs this value D2 to the second comparator 152. The second integrated value D2 is represented by the line in the graph in FIG. 4A.

It will be assumed below that broad high-contrast areas affect viewers with low or medium levels of tolerance but not viewers with high levels of tolerance. In this case, the second comparator 152 includes a low tolerance comparator 1521 and a medium tolerance comparator 1522, as shown in FIG. 5.

The low tolerance comparator 1521 stores a low tolerance threshold L21, indicated in FIG. 4A. If the second integrated value D2 exceeds this low tolerance threshold L21 (as at the black circle in FIG. 4A), a signal E21 (FIG. 4C) in a second effect signal group E2 is output to switch from state R3, in which stereoscopic video viewing is allowed, to state R2, in which two-dimensional video viewing is recommended. This low tolerance threshold L21 is placed at a level such that when the threshold L21 is exceeded, the video image would presumably affect viewers with low levels of tolerance to broad high-contrast areas.

The low tolerance comparator 1521 has a hysteresis function: once it has switched to the state R2 in which two-dimensional viewing is recommended, even if the second integrated value D2 falls below the low tolerance threshold L21, no recovery to the state R3 in which stereoscopic video viewing is allowed takes place until video viewing is stopped or ends.

The medium tolerance comparator 1522 stores a medium tolerance threshold L22, indicated in FIG. 4A. If the second integrated value D2 exceeds this medium tolerance threshold L22, a signal E22 (FIG. 4B) in the second effect signal group E2 is output to switch from the state R3 that allows stereoscopic video viewing to the state R2 that recommends two-dimensional viewing. This medium tolerance threshold L22 is placed at a level such that when the threshold L22 is exceeded, the video image would presumably affect viewers with medium levels of tolerance to broad high-contrast areas.

The medium tolerance comparator 1522 has a hysteresis function: once it has switched to the state R2 in which two-dimensional viewing is recommended, even if the second integrated value D2 falls below the low tolerance threshold L22, no recovery to the state R3 in which stereoscopic video viewing is allowed takes place until video viewing is stopped or ends.

The outputs E21 and E22 of the low and medium tolerance comparators 1521 and 1522 are output to the limitation determiner 16 in FIG. 1 as the second effect signal group E2.

The third factor extractor 122 calculates the difference in average brightness between the left-eye and right-eye images, extracts the ratio of the difference in average brightness to the average brightness of the whole video, generates third factor information B3 with eight levels from level 0 to level 7 as shown in Table 4, and outputs the third factor information B3 to the third coefficient converter 133. The third factor information B3 has eight levels in the first embodiment, but this is not a restriction; the number of levels may be more than eight or less than eight.

TABLE 4

Third factor information

| Brightness difference ratio Rd (%) | Level |
|---|---|
| Rd = 0 | 0 |
| 0 ≦ Rd < 3 | 1 |
| 3 ≦ Rd < 6 | 2 |
| 6 ≦ Rd < 9 | 3 |
| 9 ≦ Rd < 12 | 4 |
| 12 ≦ Rd < 15 | 5 |
| 15 ≦ Rd < 18 | 6 |
| 18 ≦ Rd | 7 |

On the basis of the third factor information B3, the third coefficient converter 133 generates a third effect coefficient C3 indicating the degree of effect on the viewer in a predetermined unit time and outputs this coefficient C3 to the third integrator 143. A larger value of C3 indicates a greater effect on the viewer, and a smaller value indicates a lesser effect. A positive value means that an effect is present. If there is no effect, the value becomes negative, indicating that the effect on the viewer is expected to decay over time. The third effect coefficient C3 corresponds to the slope of the line in the graph in FIG. 6A and can be generated by logic circuits or a lookup table (LUT).

The third integrator 143 in FIG. 1 generates a third integrated value D3 by integrating the third effect coefficient C3 over the unit time and outputs this value D3 to the third comparator 153. The third integrated value D3 is represented by the line in the graph in FIG. 6A.

Figure 7:
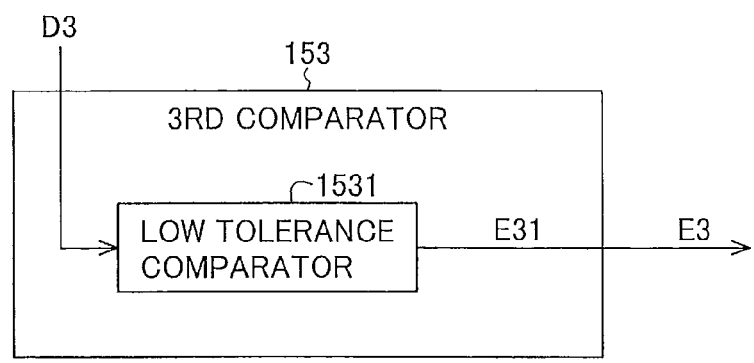
FIG. 7 is a block diagram showing the internal structure of the third comparator in FIG. 1.

It will be assumed below that the difference in average brightness between the left-eye and right-eye images has effects on viewers with low levels of tolerance and has no effects on viewers with high or medium levels of tolerance. In this case, the third comparator 153 includes only a low tolerance comparator 1531, as shown in FIG. 7.

Figure 6B:

The low tolerance comparator 1531 stores a low tolerance threshold L31, indicated in FIG. 6A. If the third integrated value D3 exceeds this low tolerance threshold L31, a signal E31 (FIG. 6B) in a third effect signal group E3 is output to switch from state R3, in which stereoscopic video viewing is allowed, to state R2, in which two-dimensional video viewing is recommended. This low tolerance threshold L31 is placed at a level such that when the threshold L31 is exceeded, the video image would presumably affect viewers with low levels of tolerance to a large difference in brightness between the left-eye and right-eye images.

The low tolerance comparator 1531 has a hysteresis function: once it has switched to the state R2 in which two-dimensional viewing is recommended, even if the third integrated value D3 falls below the low tolerance threshold L31, no recovery to the state R3 in which stereoscopic video viewing is allowed takes place until video viewing is stopped or ends.

The output E31 of the low tolerance comparator 1531 is output to the limitation determiner 16 as constituting the third effect signal group E3 in FIG. 1.

The fourth factor extractor 124 in FIG. 1 extracts the displayed object having the greatest vergence angle in the video signal A0, generates fourth factor information B1 with eight levels from level 0 to level 7 as shown in Table 5, indicating that a large vergence angle is a factor affecting the viewer, and outputs the fourth factor information B4 to the fourth coefficient converter 134. Although the fourth factor information B4 has eight levels in the first embodiment, this is not a restriction; the number of levels may be more than eight or less than eight.

TABLE 5

Fourth factor information

| Vergence angle β (minutes) | Level |
|---|---|
| β = 0 | 0 |
| 0 ≦ β < 6 | 1 |
| 6 ≦ β < 12 | 2 |
| 12 ≦ β < 18 | 3 |
| 18 ≦ β < 24 | 4 |
| 24 ≦ β < 30 | 5 |
| 30 ≦ β < 36 | 6 |
| 36 ≦ β | 7 |

On the basis of the fourth factor information B4, the fourth coefficient converter 134 generates a fourth effect coefficient C4 indicating the degree of effect on the viewer in a predetermined unit time and outputs this coefficient C4 to the fourth integrator 144. A larger value of C4 indicates a greater effect on the viewer, and a smaller value indicates a lesser effect. A positive value means that an effect is present. If there is no effect, the value becomes negative, indicating that the effect on the viewer is expected to decay over time. The fourth effect coefficient C4 corresponds to the slope of the line in the graph in FIG. 8A and can be generated by logic circuits or a lookup table (LUT).

The fourth integrator 144 in FIG. 1 generates a fourth integrated value D4 by integrating the fourth effect coefficient C4 over the unit time and outputs this value D4 to the fourth comparator 154. The fourth integrated value D4 is represented by the line in the graph in FIG. 8A.

It will be assumed below that a large vergence angle has effects on viewers with low or medium levels of tolerance and has no effects on viewers with high levels of tolerance. In this case, the fourth comparator 154 includes a low tolerance comparator 1541 and a medium tolerance comparator 1542, as shown in FIG. 9.

The low tolerance comparator 1521 stores a low tolerance threshold L41, indicated in FIG. 8A. If the fourth integrated value D4 exceeds this low tolerance threshold L41 (as at the black circle in FIG. 8A), a signal E41 (FIG. 8C) in a fourth effect signal group E4 is output to switch from state R3, in which stereoscopic video viewing is allowed, to state R2, in which two-dimensional video viewing is recommended. The low tolerance threshold L41 is placed at a level such that when the low tolerance threshold L41 is exceeded, the video image would presumably affect viewers with low levels of tolerance to large vergence angles.

The low tolerance comparator 1541 has a hysteresis function: once it has switched to the state R2 in which two-dimensional viewing is recommended, even if the fourth integrated value D4 falls below the low tolerance threshold L41 (as at the white circle in FIG. 8A), no recovery to the state R3 in which stereoscopic video viewing is allowed takes place until video viewing is stopped or ends.

The medium tolerance comparator 1542 stores a medium tolerance threshold L42, indicated in FIG. 8A. If the fourth integrated value D4 exceeds this medium tolerance threshold L42, a signal E42 (FIG. 8B) in the fourth effect signal group E4 is output to switch from the state R3 that allows stereoscopic video viewing to the state R2 that recommends two-dimensional viewing. The medium tolerance threshold L42 is placed at a level such that when the threshold L42 is exceeded, the video image would presumably affect viewers with medium levels of tolerance to large vergence angles.

The medium tolerance comparator 1542 has a hysteresis function: once it has switched to the state R2 in which two-dimensional viewing is recommended, even if the fourth integrated value D4 falls below the low tolerance threshold L42, no recovery to the state R3 in which stereoscopic video viewing is allowed takes place until video viewing is stopped or ends.

The outputs E41 and E42 of the low tolerance comparator 1541 and medium tolerance comparator 1542 are output to the limitation determiner 16 in FIG. 1 as the fourth effect signal group E4.

Figure 10:
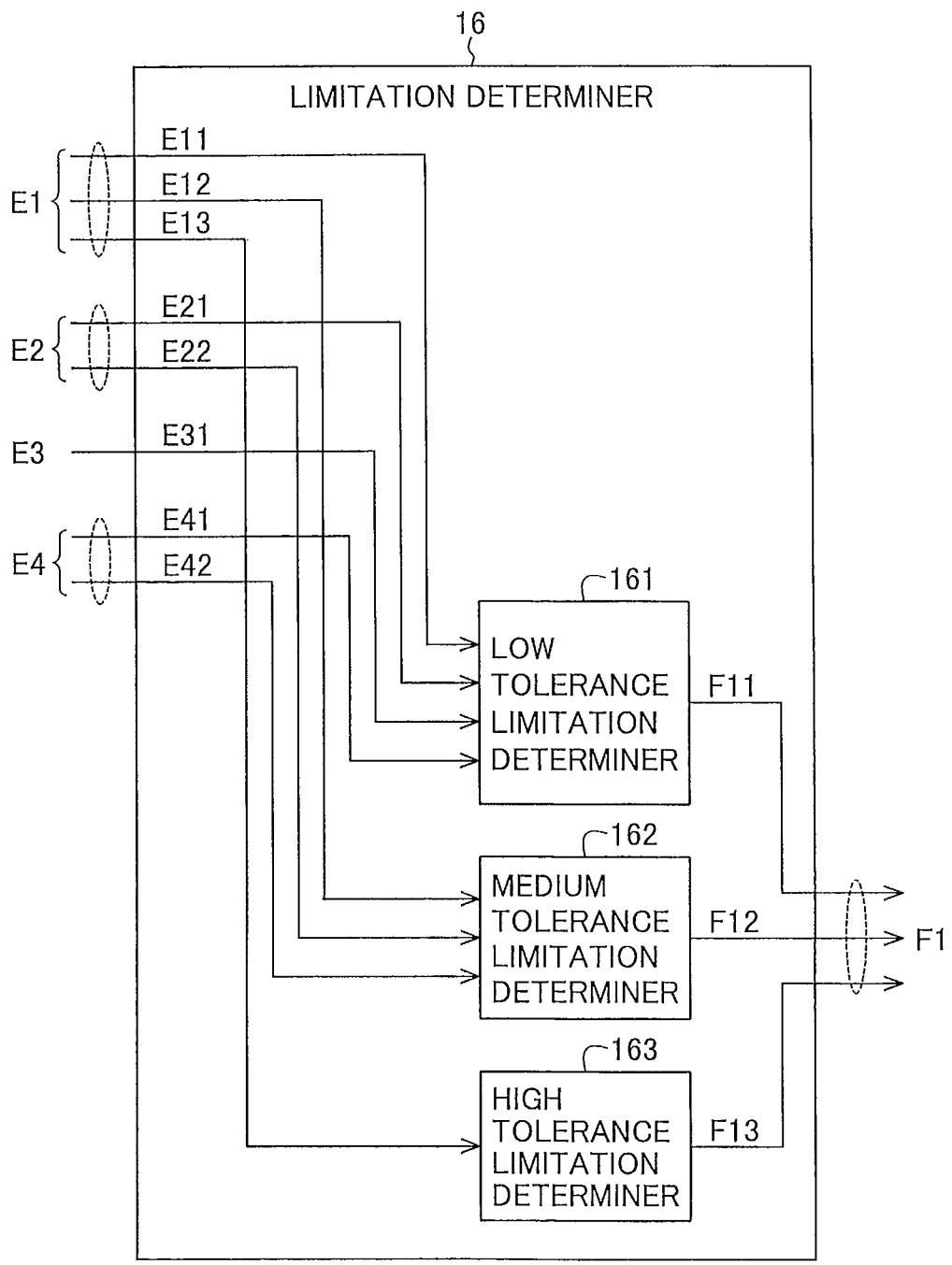
FIG. 10 is a block diagram showing the internal structure of the limitation determiner in FIG. 1.

Next the limitation determiner 16 shown in FIG. 1, which receives the first, second, third, and fourth effect signal groups E1, E2, E3, E4, will be described. The limitation determiner 16 includes a low tolerance limitation determiner 161, a medium tolerance limitation determiner 162, and a high tolerance limitation determiner 163, as shown in FIG. 10.

The low tolerance limitation determiner 161 receives the signal E11 generated by the low tolerance comparator 1511, the signal E21 generated by the low tolerance comparator 1521, the signal E31 generated by the low tolerance comparator 1531, and the signal E41 generated by the low tolerance comparator 1541, and generates a viewing limitation signal F11 for viewers with low levels of tolerance to stereoscopic video viewing. The low tolerance limitation determiner 161 is configured to operate so as to generate a viewing limitation signal F11 that switches from state R3, in which stereoscopic video viewing is allowed, to state R2, in which two-dimensional video viewing is recommended, whenever at least one of the four signals E11, E21, E31, and E41 is switched from the state R3 that allows stereoscopic video viewing to the state R2 that recommends two-dimensional viewing.

By configuring the low tolerance limitation determiner 161 in this way, it is possible to eliminate the effects of stereoscopic video viewing on the viewer at an early stage.

The low tolerance limitation determiner 161 can also be configured to operate, however, so as to generate a viewing limitation signal F11 that does not switch from the state R3 that allows stereoscopic video viewing to the state R2 that recommends two-dimensional viewing until at least half, in the first embodiment at least two, of the input signals have switched from the state R3 that allows stereoscopic video viewing to the state R2 that recommends two-dimensional viewing.

By configuring the low tolerance limitation determiner 161 in this way, it is possible to prevent unnecessarily severe limitations on the effects of stereoscopic video viewing on the viewer.

The low tolerance limitation determiner 161 can also be configured to operate so as to generate a viewing limitation signal F11 that switches from the state R3 that allows stereoscopic video viewing to the state R2 that recommends two-dimensional viewing according to a priority order among the input signals.

By configuring the low tolerance limitation determiner 161 in this way, it is possible to quickly eliminate stereoscopic video viewing effect factors that strongly affect the viewer while preventing excessive limitations due to stereoscopic video viewing factors with lesser effects.

The medium tolerance limitation determiner 162 receives the signal E12 generated by medium tolerance comparator 1512 in the first effect signal group E1, the signal E22 generated by medium tolerance comparator 1522 in the second effect signal group E2, and the signal E42 generated by medium tolerance comparator 1542 in the fourth effect signal group E4, and generates a viewing limitation signal F12 for viewers with medium levels of tolerance to stereoscopic video viewing. The medium tolerance limitation determiner 162 is configured to operate so as to generate a viewing limitation signal F12 that switches from state R3, in which stereoscopic video viewing is allowed, to state R2, in which two-dimensional video viewing is recommended, whenever at least one of the three signals E12, E22, and E42 is switched from the state R3 that allows stereoscopic video viewing to the state R2 that recommends two-dimensional viewing. By configuring the medium tolerance limitation determiner 162 in this way, it is possible to eliminate the effects of stereoscopic video viewing on the viewer at an early stage.

The medium tolerance limitation determiner 162 may also be configured to operate, however, so as not to switch viewing limitation signal F12 from the state R3 that allows stereoscopic video viewing to the state R2 that recommends two-dimensional viewing until the input signals representing at least half of the factors, in the first embodiment at least two of the three input signals representing the four factors, switch from the state R3 that allows stereoscopic video viewing to the state R2 that recommends two-dimensional viewing. By configuring the medium tolerance limitation determiner 162 in this way, it is possible to prevent excessive limitations on the effects of stereoscopic video viewing.

The medium tolerance limitation determiner 162 may also operate to switch viewing limitation signal F12 from the state R3 that allows stereoscopic video viewing to the state R2 that recommends two-dimensional viewing according to a priority order of the input signals. By configuring the medium tolerance limitation determiner 162 in this way, it is possible to quickly eliminate stereoscopic video viewing effect factors that strongly affect the viewer while preventing excessive limitations due to stereoscopic video viewing factors with lesser effects.

The high tolerance limitation determiner 163 receives the signal E13 generated by the high tolerance comparator 1513 as part of the first effect signal group E1, and generates a viewing limitation signal F13 for viewers with high levels of tolerance to stereoscopic video viewing. In the first embodiment there is only one input, so the input signal E13 becomes the output signal F13. If there are a plurality of inputs, the high tolerance limitation determiner 163 may have a configuration similar to the low tolerance limitation determiner 161 or medium tolerance limitation determiner 162 described above.

The viewing limitation signals F11, F12, and F13 output from the low tolerance limitation determiner 161, medium tolerance limitation determiner 162, and high tolerance limitation determiner 163 are input to the output unit 17 shown in FIG. 1 as the viewing limitation signal group F1 shown in FIGS. 1 and 10.

Of the above elements, the factor extractors 121-124, coefficient converters 131-134, integrators 141-144, comparators 151-155, and limitation determiner 16 constitute a stereoscopic video viewing limiter 10. The effect coefficients C1 to C4 constitute an effect coefficient group, and the integrated values D1 to D4 constitute an integrated value group.

The operation of the output unit 17 when it receives the viewing limitation signal group F1 will be described with reference to FIGS. 11A to 11E. When the constituent viewing limitation signals F11, F12, and F13 in FIGS. 11A to 11C are all in the state in which stereoscopic video viewing is allowed, a state indicated as 'F1=0' in FIG. 11D, the warning signal G1 indicates that no viewing limitation is imposed. This state is indicated as G1=0 in FIG. 11E.

When viewing limitation signal F11 in FIG. 11A is in the state in which two-dimensional video viewing is recommended and viewing limitation signals F12 and F13 in FIGS. 11B and 11C are in the state in which stereoscopic video viewing is allowed, a state indicated as 'F1=1' in FIG. 11D, the warning signal G1 sends a two-dimensional video viewing recommendation to viewers with low levels of tolerance to stereoscopic video viewing. This state is indicated as G1=1 in FIG. 11E.

When the viewing limitation signals F11 and F12 in FIGS. 11A and 11B are in the state in which two-dimensional video viewing is recommended and the viewing limitation signal F13 in FIG. 11C is in the state in which stereoscopic video viewing is allowed, a state indicated as 'F1=2' in FIG. 11D, the warning signal G1 sends a two-dimensional video viewing recommendation to viewers with low or medium levels of tolerance to stereoscopic video viewing. This state is indicated as G1=2 in FIG. 11E.

When the viewing limitation signals F11, F12, and F13 in FIGS. 11A, 11B, and 11C are all in the state in which two-dimensional video viewing is recommended, a state indicated as 'F1=3' in FIG. 11D, the warning signal G1 sends a two-dimensional video viewing recommendation to all viewers. This state is indicated as G1=3 in FIG. 11E.

The viewer may be notified of the warning signal G1 in various ways. The warning signal G1 may be sent to a small receiver in the viewer's possession, and the receiver may warn the viewer information by light or vibration. Alternatively, the warning signal G1 may be sent to the stereoscopic video display device, and the display device may display a warning to the viewer.

Individual stereoscopic video viewing tolerances are divided into three levels in the example above, but any number of levels may be designated. The factors that can affect stereoscopic video viewers are not necessarily those listed in Table 1, and the number of factors is not restricted to four.

Because of the above arrangements, when a plurality of viewers watch the same stereoscopic video display simultaneously, the first embodiment of the invention enables each viewer to choose whether to watch stereoscopic video or two-dimensional video according to the viewer's individual stereoscopic viewing tolerance.

Second Embodiment

Figure 12:
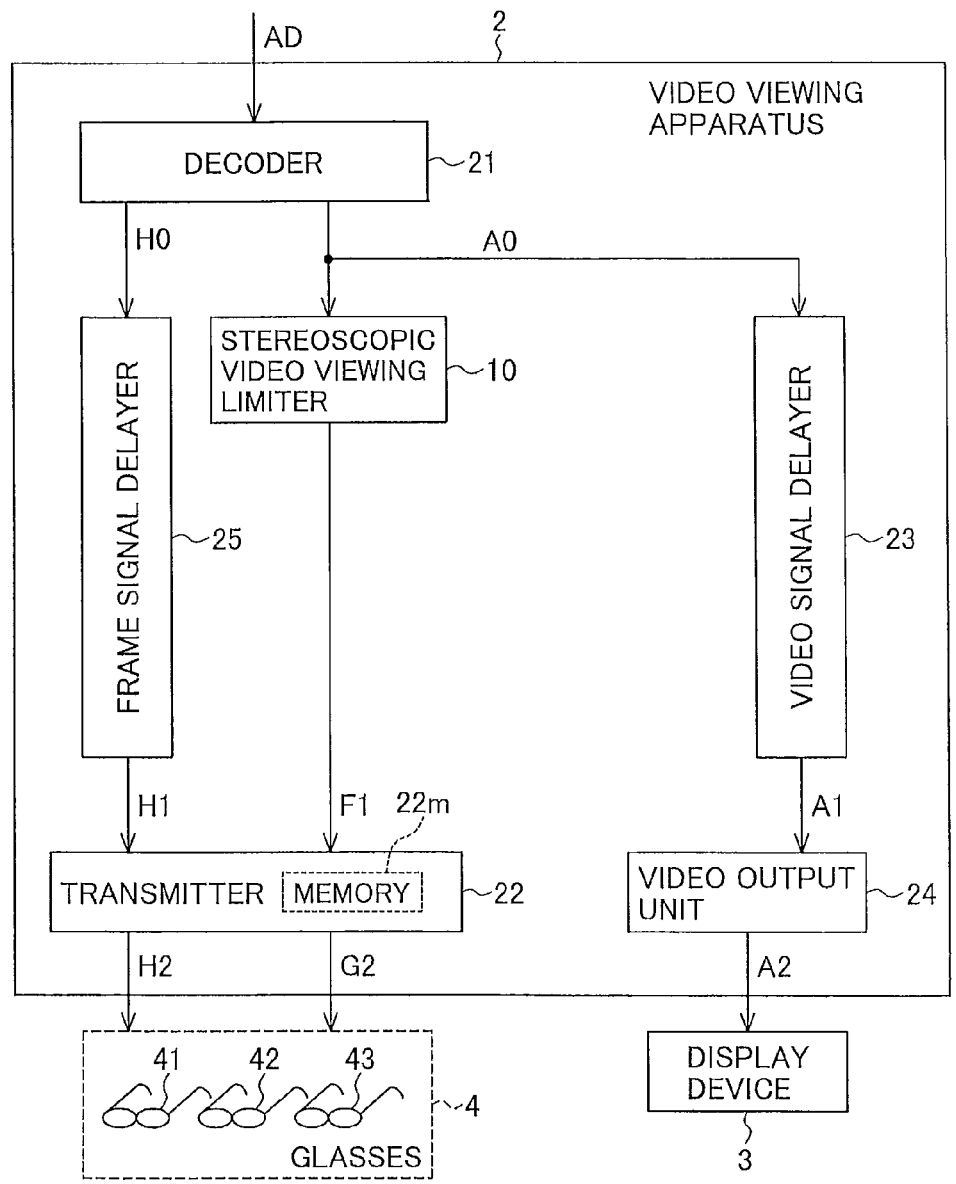
FIG. 12 is a block diagram of a video viewing apparatus according to a second embodiment of the invention.

The second embodiment concerns a video viewing apparatus that creates a stereoscopic effect by alternately opening and closing left-eye and right-eye shutters in a pair of glasses worn by the viewer and displaying a right-eye image and a left-eye image with parallax to the corresponding eyes and a video viewing system including the video viewing apparatus, a display device, and the glasses. A block diagram illustrating the structure of the second embodiment is shown in FIG. 12. Elements in the second embodiment that have the same functions and perform the same operations as in the first embodiment are indicated by the same reference characters as in the first embodiment, and descriptions will be omitted.

In the second embodiment, video data AD read from an optical disc or supplied through the Internet by a content provider are input to a decoder 21 in the video viewing apparatus 2.

If the video data have been encrypted for copyright protection, the decoder 21 decrypts the data. If the video data have been band-compressed, the decoder 21 decompresses the data. The decoder 21 then generates a video signal A0 alternately representing left-eye and right-eye video images in a time sequence as shown in FIG. 13A, and a frame signal H0 indicating the timings at which the right-eye image and the left-eye image are output, as shown in FIG. 13B. In FIG. 13B the low level of the frame signal H0 corresponds to the time during which the left-eye image is output and the high level corresponds to the time during which the right-eye image is output, but the opposite correspondence is also possible.

Referring again to FIG. 12, the video signal A0 generated by the decoder 21 is input to the stereoscopic video viewing limiter 10. The stereoscopic video viewing limiter 10, which is configured as in the first embodiment, generates a viewing limitation signal group F1 by similar operations and outputs it to a transmitter 22.

A video signal delayer 23 generates a delayed video signal A1 that is delayed by a time equal to the time needed to obtain the viewing limitation signal group F1 from the video signal A0, and outputs the delayed video signal A1 to the video output unit 24 shown in FIG. 12. The video output unit 24 converts the delayed video signal A1 to a display video signal A2 suitable for the display device 3, which is external to the video viewing apparatus 2, and outputs the display video signal A2 to the display device 3.

The frame signal delayer 25 shown in FIG. 12 delays the frame signal H0 generated by the decoder 21 by a time equal to the time needed to obtain the viewing limitation signal group F1 from the video signal A0 and outputs the delayed frame signal H1 to the transmitter 22 shown in FIG. 12.

The transmitter 22 shown in FIG. 12 generates a glasses control signal G2 encoding the information in the viewing limitation signal group F1 in FIGS. 4A to 4D as shown in FIG. 4E, for example, generates a glasses frame signal H2 by converting the delayed frame signal H1 for output to the glasses 4, and outputs these signals G2 and H2 to the glasses 4 worn by the viewer by radio, infrared, or wireline transmission.

The operation of the glasses 4 worn by the viewers watching the stereoscopic video when the glasses 4 receive the glasses control signal G2 and the glasses frame signal H2 will be described with reference to FIGS. 15A to 15K.

There are three types of glasses 4: glasses 41 are for (are intended to be worn by) viewers with low levels of tolerance to stereoscopic video viewing; glasses 42 are for (are intended to be worn by) viewers with medium levels of tolerance to stereoscopic video viewing; glasses 43 are for (are intended to be worn by) viewers with high levels of tolerance to stereoscopic video viewing.

Figure 16:
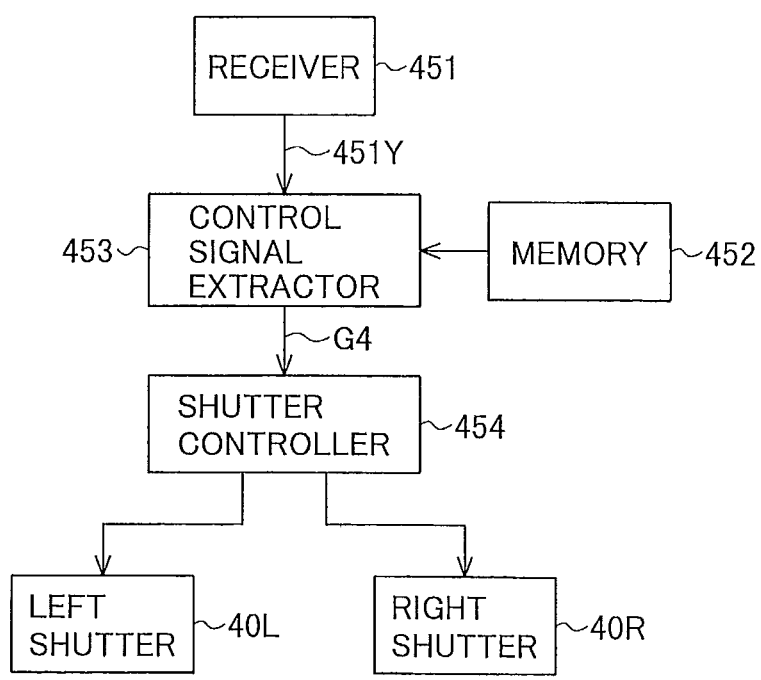
FIG. 16 is a block diagram showing an example of the functional configuration of the glasses in the second embodiment.

Each pair of glasses 4 comprises, for example, a receiver 451, a memory 452, a control signal extractor 453, a shutter controller 454, a left shutter 40L, and a right shutter 40R, as shown in FIG. 16.

The receiver 451 receives the glasses frame signal H2 and glasses control signal G2 sent from the transmitter 22 by, for example, radio, infrared, or wireline transmission.

The memory 452 stores data indicating which of the three types of glasses it belongs to: the glasses 41 for viewers with low levels of tolerance to stereoscopic video viewing, the glasses 42 for viewers with medium levels of tolerance to stereoscopic video viewing, or the glasses 43 for viewers with high levels of tolerance to stereoscopic video viewing (data indicating the tolerance of the viewer wearing (or intended to wear) the glasses).

From the received control signals, the control signal extractor 453 extracts the control signal applicable to the glasses, that is, the signal matching the glasses type stored in the memory 452, i.e., the signal matching the data indicating the viewer's tolerance level. The content of the extracted control signal G4 indicates either that stereoscopic video viewing is allowed or that two-dimensional video viewing is recommended.

The shutter controller 454 controls the shutters 40L, 40R in accordance with the control signal G4 extracted by the control signal extractor 453 and the frame signal H2.

When stereoscopic video viewing is allowed by the control signal G4, the shutter controller 454 controls the shutters so that they operate in a stereoscopic mode; when two-dimensional video viewing is recommended by the control signal G4, the shutter controller 454 controls the shutters so that they operate in a two-dimensional mode.

In the stereoscopic mode, the shutters 40L, 40R open and close alternately (one is closed while the other is open).

In the two-dimensional mode, the shutters 40L, 40R open and close at the same time and maintain the same open or closed state (when one is open the other is also open; when one is closed the other is also closed).

The video viewing apparatus 2, display device 3, and glasses 4 constitute a stereoscopic video viewing system.

FIGS. 15A and 15B illustrate the glasses frame signal H2 and glasses control signal G2 received by the glasses 4; FIGS. 15C to 15E illustrate the output G4 of the control signal extractor 453 and the operation of the left shutter 40L and the right shutter 40R in the glasses 41 worn by a viewer with a low level of tolerance to stereoscopic video viewing; FIGS. 15F to 15H illustrate the output G4 of the control signal extractor 453 and the operation of the left shutter 40L and the right shutter 40R in the glasses 42 worn by a viewer with a medium level of tolerance to stereoscopic video viewing; FIGS. 15I to 15K illustrate the output G4 of the control signal extractor 453 and the operation of the left shutter 40L and the right shutter 40R in the glasses 43 worn by a viewer with a high level of tolerance to stereoscopic video viewing. In the following description, the shutters are open, permitting the image displayed by the display device 3 to reach the viewer's eye, when the waveforms shown in FIGS. 15D, 15E, 15G, 15H, 15J, and 15K, are low, and are closed, preventing the image displayed by the display device 3 from reaching the viewer's eye, when the waveforms are high.

As shown in FIGS. 15B, 15C, 15D, and 15E, in the glasses 41 for viewers with low levels of tolerance to stereoscopic video viewing, when the glasses control signal G2 is '0', the output G4 of the control signal extractor 453 is low, so that while the display device 3 is displaying a left-eye image, the left shutter 40L is open and the left-eye image enters the viewer's left eye but the right shutter 40R is closed and the left-eye image does not enter the viewer's right eye, and while the display device 3 is displaying a right-eye image, the right shutter 40R is open and the right-eye image enters the viewer's right eye but the left shutter 40L is closed and the right-eye image does not enter the viewer's left eye. This operation provides stereoscopic video viewing when the glasses control signal G2 is '0'. When the glasses control signal G2 is not '0', that is, when the glasses control signal G2 is '1', '2', or '3', the output G4 the control signal extractor 453 is high, and while the display device 3 is displaying a left-eye image, both the left shutter 40L and the right shutter 40R are opened so that the left-eye image enters both eyes, but while the display device 3 is displaying a right-eye image, both the left shutter 40L and the right shutter 40R are closed. This operation provides two-dimensional video viewing when the glasses control signal G2 is other than '0'.

As shown in FIGS. 15B, 15F, 15G, and 15H, in the glasses 42 for viewers with medium levels of tolerance to stereoscopic video viewing, when the glasses control signal G2 is '0' or '1', the output G4 of the control signal extractor 453 is low, so that while the display device 3 is displaying a left-eye image, the left shutter 40L is open and the left-eye image enters the viewer's left eye but the right shutter 40R is closed and the left-eye image does not enter the viewer's right eye, and while the display device 3 is displaying a right-eye image, the right shutter 40R is open and the right-eye image enters the viewer's right eye but the left shutter 40L is closed and the right-eye image does not enter the viewer's left eye. This operation provides stereoscopic video viewing when the glasses control signal G2 is '0' or '1'. When the glasses control signal G2 is not '0' or '1', that is, when the glasses control signal G2 is '2' or '3', the output G4 the control signal extractor 453 is high, and while the display device 3 is displaying a left-eye image, both the left shutter 40L and the right shutter 40R are opened so that the left-eye image enters both eyes, but while the display device 3 is displaying a right-eye image, both the left shutter 40L and the right shutter 40R are closed. This operation provides two-dimensional video viewing when the glasses control signal G2 is '2' or '3'.

As shown in FIGS. 15B, 15I, 15J, and 15K, in the glasses 43 for viewers with high levels of tolerance to stereoscopic video viewing, when the glasses control signal G2 is '0', '1' or '2', the output G4 of the control signal extractor 453 is low, so that while the display device 3 is displaying a left-eye image, the left shutter 40L is open and the left-eye image enters the viewer's left eye but the right shutter 40R is closed and the left-eye image does not enter the viewer's right eye, and while the display device 3 is displaying a right-eye image when the glasses control signal G2 is '0', '1' or '2', the right shutter 40R is open and the right-eye image enters the viewer's right eye but the left shutter 40L is closed and the right-eye image does not enter the viewer's left eye. This operation provides stereoscopic video viewing when the glasses control signal G2 is '0', '1' or '2'. When the glasses control signal G2 is '3', the output G4 the control signal extractor 453 is high, and while the display device 3 is displaying a left-eye image, both the left shutter 40L and the right shutter 40R are opened so that the left-eye image enters both eyes, but while the display device 3 is displaying a right-eye image, both the left shutter 40L and the right shutter 40R are closed. This operation provides two-dimensional video viewing when the glasses control signal G2 is '3'.

In each of the glasses 41, 42, 43, the time during which the display device 3 is displaying a left-eye image is distinguished from the time during which the display device 3 is displaying a right-eye image by the frame signal H2 transmitted from the transmitter 22 in the video viewing apparatus 2 together with the glasses control signal G2. That is, the shutter controller 454 decides from frame signal H2 whether a left-eye or a right-eye image is being displayed, and controls the opening and closing of the left shutter 40L and right shutter 40R accordingly.

Instead of the memory 452 in the glasses 4, a switch may be provided to set the glasses for viewers with low, medium, or high levels of tolerance to stereoscopic video viewing. The control signal extractor 453 then extracts control signals for the glasses in accordance with the switch setting (its operative position).

The glasses 41, 42, 43 for viewers with low, medium, or high levels of tolerance to stereoscopic video viewing should preferably be visually distinguishable. If a switch is provided, the visual distinction between glasses for viewers with low, medium, and high tolerance levels may be made by the setting (operative position) of the switch.

To protect children, viewers with an interpupillary distance up to a predetermined value may be identified as viewers with a low level of tolerance to stereoscopic video viewing.

The left-eye image was used here for two-dimensional video viewing, but the right-eye image may be used instead.

The number of different stereoscopic video viewing tolerance levels is not limited to three, and the number of factors affecting stereoscopic video viewers is not limited to four.

Because of the above arrangements, the second embodiment of the invention can be controlled so that when a plurality of viewers watch the same stereoscopic video display simultaneously, they see stereoscopic video or two-dimensional video according to their individual stereoscopic viewing tolerances.

In addition, because of the above arrangements, the second embodiment of the invention enables the viewers to watch stereoscopic video according to their individual stereoscopic viewing tolerances even if the display device is not equipped to transmit control signals to the glasses.

Third Embodiment

The third embodiment concerns a video viewing apparatus that creates a stereoscopic effect by alternately opening and closing left-eye and right-eye shutters in a pair of glasses worn by the viewer and displaying a right-eye image and a left-eye image with parallax to the corresponding eyes, and a video viewing system including the video viewing apparatus, a display device, and the glasses. A feature of the third embodiment is that the control generated by the video viewing apparatus responsive to the viewers' tolerances for stereoscopic video viewing is executed in the glasses worn by the viewers, via the display device that displays the stereoscopic video image.

Figure 17:
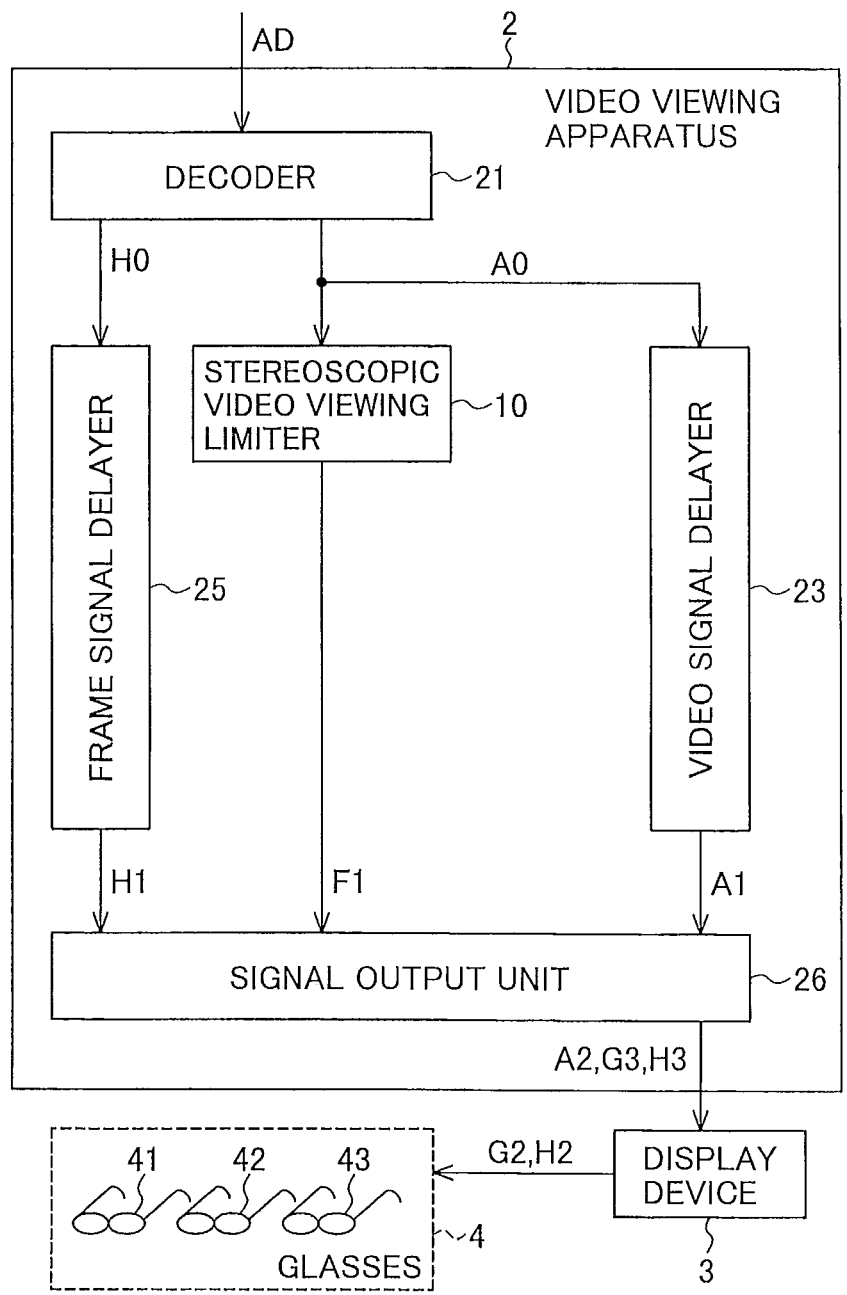
FIG. 17 is a block diagram of a video viewing apparatus according to a third embodiment of the invention.

The video viewing apparatus in the third embodiment is structured, for example, as shown in FIG. 17. Elements in the third embodiment that have the same functions and perform the same operations as in the first and second embodiments are indicated by the same reference characters as in the first and second embodiments, and descriptions will be omitted. The operations up to output of the viewing limitation signal group F1 from the limitation determiner 16, the delayed video signal A1 from the video signal delayer 23, and the delayed frame signal H1 from the frame signal delayer 25 are the same as in the second embodiment.

In the third embodiment, the signal output unit 26 converts the viewing limitation signal group F1 output from the stereoscopic video viewing limiter 10 in FIG. 17, the delayed video signal A1 output from the video signal delayer 23, and the delayed frame signal H1 output from the frame signal delayer 25 to a display video signal A2, a display control signal G3, and a display frame signal H3 suitable for output to a display device 3 external to the video viewing apparatus 2, and outputs these signals to the display device 3 as shown in FIG. 17.

The display device 3 displays left-eye and right-eye video images in alternate sequence in accordance with the display video signal A2. The display device 3 also generates a glasses control signal G2 and glasses frame signal H2 from the display control signal G3 and display frame signal H3 output to the display device 3, and sends these signals to the glasses 4 worn by the viewer by radio, infrared, or wireline transmission as in the second embodiment.

As in the second embodiment, there are three types of glasses 4: glasses 41 for viewers with low levels of tolerance to stereoscopic video viewing, glasses 42 for viewers with medium levels of tolerance to stereoscopic video viewing, and glasses 43 for viewers with high levels of tolerance to stereoscopic video viewing, all of which operate as described in the second embodiment.

Because of the above arrangement, the third embodiment can be controlled so that when a plurality of viewers watch the same stereoscopic video display simultaneously, they see stereoscopic video or two-dimensional video according to their individual stereoscopic viewing tolerances. If a plurality of video data source units such as an optical disc reproducing apparatus and apparatus for supplying content data downloaded from the Internet are connected to a single display device, even when the different source units operate simultaneously, the video viewing apparatus, because it is disposed between the source units and the display device, can carry out appropriate control in accordance with the viewers' individual stereoscopic viewing tolerances to the stereoscopic video currently being displayed by the display device. Since the video viewing apparatus in this embodiment does not need to be equipped to transmit control signals to the glasses, the video viewing apparatus can be supplied at a low price.

Fourth Embodiment

In the fourth embodiment, how the invention executes control over the individual glasses worn by the viewers according to the viewers' tolerance to viewing the stereoscopic video generated by the video viewing apparatus will be described. The fourth embodiment concerns the operations that generate the glasses control signal G2 or the display-device control signal G3 from input of the viewing limitation signal group F1 to the transmitter 22 in the second embodiment or the signal output unit 26 in the third embodiment. The operations when the fourth embodiment is applied to the transmitter 22 in the second embodiment will be described first.

The following description deals with an exemplary family of six people who view a stereoscopic video simultaneously.

Table 6 lists the six viewers and their user names (UNM), their stereoscopic tolerance levels (ENC), the names (GNM) assigned to their glasses, and, listed in the rightmost column in Table 6, the binary identifiers (GID) of the glasses.

TABLE 6

Viewers and their glasses

| Viewer(UNM) | Stereoscopic tolerance (ENC) | Glasses name (GNM) | Identifier (GID) |
|---|---|---|---|
| Viewer 1 Father (UNM1) | High | Glasses 431 | 001 (GID1) |
| Viewer 2 Mother (UNM2) | High | Glasses 432 | 010 (GID2) |
| Viewer 3 Grandfather (UNM3) | Medium | Glasses 421 | 011 (GID3) |
| Viewer 4 Older boy (UNM4) | Low | Glasses 411 | 100 (GID4) |
| Viewer 5 Girl (UNM5) | Low | Glasses 412 | 101 (GID5) |
| Viewer 6 Younger boy (UNM6) | Low | Glasses 413 | 110 (GID6) |

The glasses are configured as shown in FIG. 16, for example, and the binary identifier GID is stored in the memory 452.

The relationships among the glasses to which the control signal G2 is sent, their binary identifiers GID, and their tolerance levels ENC are stored in a memory 22m (indicated by a dotted line in FIG. 12) provided in the transmitter 22. The transmitter 22 can find the tolerance level ENC corresponding to each identifier GID by referring to the memory 22m. The transmitter 22 transmits a string of control data CND (FIG. 18) including control data for each pair of glasses. The control data CNDn (n=1 to 6) for the glasses with identifier GIDn include the identifier GIDn, followed by a code PIn indicating whether or not the viewer wearing the glasses is allowed to watch the video stereoscopically. The code PIn is, for example, '0' when stereoscopic video viewing is allowed and '1' otherwise. The control data string begins with a separator SPR.

Figure 18:
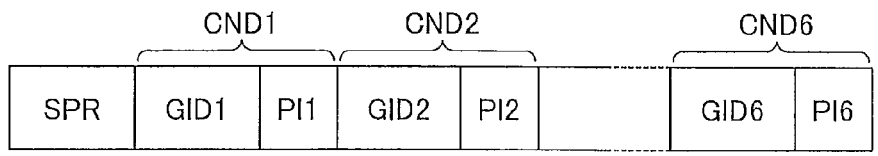
FIG. 18 illustrates the data structure of the glasses control signal in the third embodiment.

In the example shown in FIG. 18, the control data are arranged in the order in which the viewers are listed in Table 6, but in general, the control data may be arranged in any order.

The operation will now be described in further detail using the binary identifiers GID listed in Table 6. The control data and the codes indicating whether stereoscopic viewing is allowed or not are both expressed as numbers consisting of 0's and 1's; the control data are expressed as numeric strings.

By referring to the memory 22m, the transmitter 22 has recognized that the glasses 411, 412, 413 with identifiers GID4 ('100'), GID5 ('101'), and GID6 ('110') are worn by viewers with low stereoscopic tolerance levels, and generates codes PI4, PI5, PI6, as part of control data CND4, CND5, CND6, in accordance with the viewing limitation signal F11 for viewers with low stereoscopic tolerance levels in the viewing limitation signal group F1, generating a '0' code to allow these viewers UNM4, UNM5, UNM6 to watch the stereoscopic video and a '1' code to cause viewers UNM4, UNM5, UNM6 to stop watching the video stereoscopically and watch it two-dimensionally instead. From viewing limitation signal F11 the transmitter 22 generates three control data items CND4, CND5, CND6 (three numeric strings) respectively including the binary identifiers GID4, GID5, GID6 followed by the codes PI4, PI5, PI6. When stereoscopic viewing is permitted for viewers UNM4 to UNM6, numeric strings '1000', '1010', and '1100' are generated as the control data items CND4, CND5, and CND6. To make viewers UNM4 to UNM6 stop watching the video stereoscopically and watch it two-dimensionally instead, these control data items are '1001', '1011', and '1101'.

By referring to the memory 22m, the transmitter 22 has also recognized that the glasses 421 with GID3 '011' are worn by a viewer with a medium stereoscopic tolerance level, and generates a code PI3, as part of control data CND3, in accordance with the viewing limitation signal F12 for viewers with medium stereoscopic tolerance levels in the viewing limitation signal group F1, generating a '0' code to allow viewer UNM3 to watch the stereoscopic video and to '1' to cause viewer UNM3 to stop watching the video stereoscopically and watch it two-dimensionally instead. The transmitter 22 generates control data CND3 (a numeric string) including the glasses identifier GID3 of the glasses worn by this viewer with a medium tolerance to stereoscopic video viewing, followed by code PI3. When stereoscopic viewing is permitted for viewer UNM3, the numeric string '0110' is generated as control data CND3. To make viewer UNM3 stop watching the video stereoscopically and watch it two-dimensionally instead, the numeric string generated as the control data CND3 is '0111'.

Also by referring to the memory 22m, the transmitter 22 has recognized that the glasses 431, 432 with GID1 ('001') and GID2 ('010') are worn by viewers with high stereoscopic tolerance levels, and generates codes PI1, PI2, as part of control data CND1 and CND2, in accordance with the viewing limitation signal F13 for viewers with high stereoscopic tolerance levels in the viewing limitation signal group F1, generating a '0' code to allow these viewers UNM1, UNM2 to watch the stereoscopic video and a '1' code to cause viewers UNM1 and UNM2 to stop watching the video stereoscopically and watch it two-dimensionally instead. From viewing limitation signal F13 the transmitter 22 generates two control data items CND1, CND2 (two numeric strings) respectively including the identifiers GID1, GID2 of the viewers with high tolerances to stereoscopic video viewing, followed by codes PI1, PI2. When stereoscopic viewing is permitted for viewers UNM1 and UNM2, the numeric strings '0010' and '0100' are generated as control data items CND1 and CND2. To make viewers UNM1 and UNM2 stop watching the video stereoscopically and watch it two-dimensionally instead, the numeric strings generated as control data items CND1 and CND2 are '0011' and '0101'.

The separator SPR is a numeric string that cannot be generated as control data from the glasses identifiers GID and viewing limitation signal group F1 and cannot occur in the control data string. The sequence beginning with the separator and continuing with the control data items CND1 to CND6 for each pair of glasses, these control data items being combinations of the glasses identifiers GID1 to GID6 and codes PI1 to PI6 generated from the viewing limitation signal group F1, is sent to the glasses 431, 432, 421, 411, 412, 413 repeatedly as the glasses control signal G2.

Figure 19A:
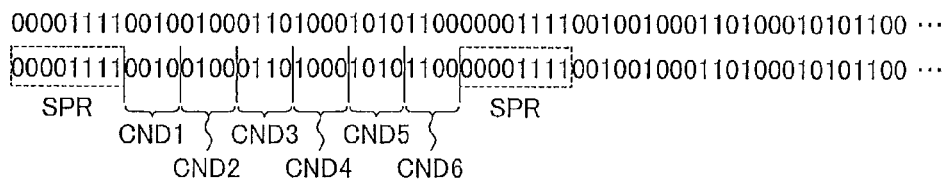
FIGS. 19A to 19D show exemplary numeric strings forming the glasses control signal in the third embodiment.
Figure 19B:
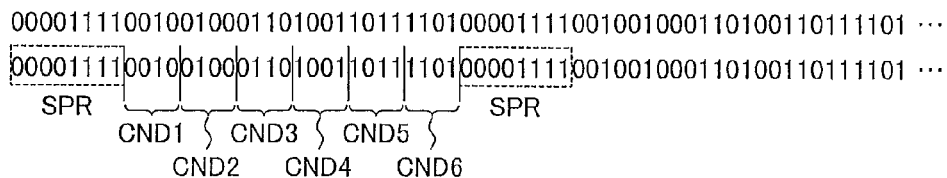
Figure 19C:
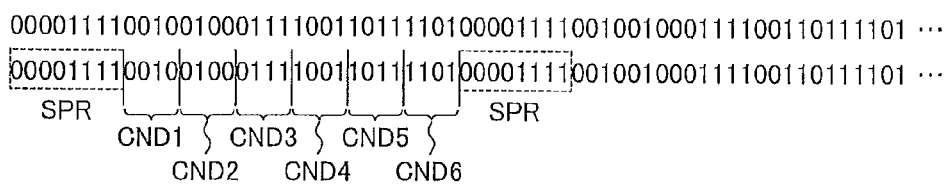
Figure 19D:
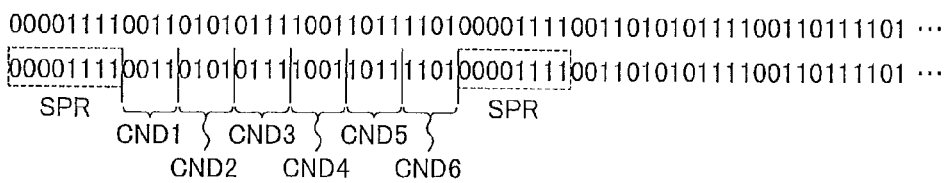

In the glasses control signals G2 illustrated in FIGS. 19A to 19D, the separator SPR is '00001111'. The upper row in FIG. 19A shows the numeric string of the glasses control signal G2 when all the viewers are allowed to view stereoscopic video. The upper row in FIG. 19B shows the numeric string of the glasses control signal G2 when viewers with low stereoscopic viewing tolerances are urged to view two-dimensional video and the other viewers are allowed to view stereoscopic video. The upper row in FIG. 19C shows the numeric string of the glasses control signal G2 when viewers with low or medium stereoscopic viewing tolerances are urged to view two-dimensional video and the viewers with high stereoscopic viewing tolerances are allowed to view stereoscopic video. The upper row in FIG. 19D shows the numeric string of the glasses control signal G2 when all viewers are made to stop viewing stereoscopic video and view two-dimensional video instead.

Figure 20:
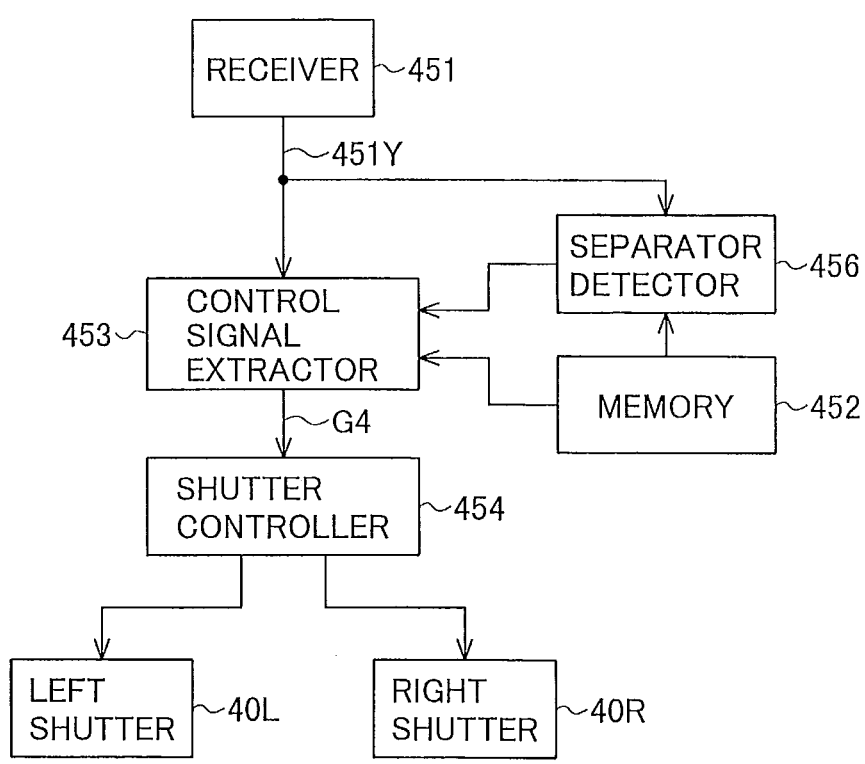
FIG. 20 is a block diagram showing an example of the functional configuration of the glasses in a fourth embodiment of the invention.

Each pair of glasses 431, 432, 421, 411, 412, 413 is structured as shown in FIG. 20. The glasses shown in FIG. 20 are generally the same as the glasses shown in FIG. 16 but have an additional separator detector 456. The memory 452 stores the glasses identifier GIDn (n=1 to 6) and the numeric string constituting the separator SPR.

In the glasses 431, 432, 421, 411, 412, 413, by referring to the memory 452, the separator detector 456 recognizes a separator SPR by finding a numeric string in the control signal 451Y received by the receiver 451 identical to the numeric string SPR constituting the separator stored in the memory 452, and reports the recognized separator to the control signal extractor 453. The control signal extractor 453 divides the numeric string following each separator SPR into four-bit units and compares the first three bits in each four-bit unit with the identifier GIDn stored in the memory 452. If they match, the control signal extractor 453 recognizes the following received bit as the code PIn indicating whether stereoscopic video viewing is allowed, tests whether this code PIn is '0' or '1', decides that stereoscopic video viewing is allowed if the code is '0', decides that two-dimensional video viewing is recommended if the code is '1', and supplies the shutter controller 454 with a signal G4 indicating the result of this decision. The shutter controller 454 controls the shutters 40L, 40R in accordance with the decision of the control signal extractor 453.

This process is performed in each pair of glasses. In glasses 431, 432, 421, 411, 412, 413, as shown in the lower row in FIGS. 19A, 19B, 19C, and 19D, the numeric string '00001111' constituting the separator SPR is found in the numeric string of the glasses control signal G2, the bit string following the separator is divided into four-bit units to obtain four-bit data, of which only the four-bit data in which the upper three bits match the identifier GIDn of the receiving pair of glasses are taken, and the operation of opening and closing the shutters mounted in the glasses is executed as shown in FIGS. 15C to 15K on the basis of the lowest bit (indicating the code PIn) in these four data bits, depending on whether the video is to be watched stereoscopically or two-dimensionally.

The stereoscopic tolerance levels of the glasses may be fixed as listed in Table 6 or may be rewritable. To make them rewritable, the memory 22m should be configured in a non-volatile rewritable recording medium such as an EEPROM, flash memory, or hard disk drive. The memory 22m may be rewritten by, for example, operating a remote control device (not shown), or by pressing the up, down, right, left, and Enter keys on a key operation panel disposed on the outer surface of the video viewing apparatus. Either operation can be carried out by methods analogous to such operations as television channel selection, the selection of DVD player functions, and audio amplifier set-up.

Figure 21:
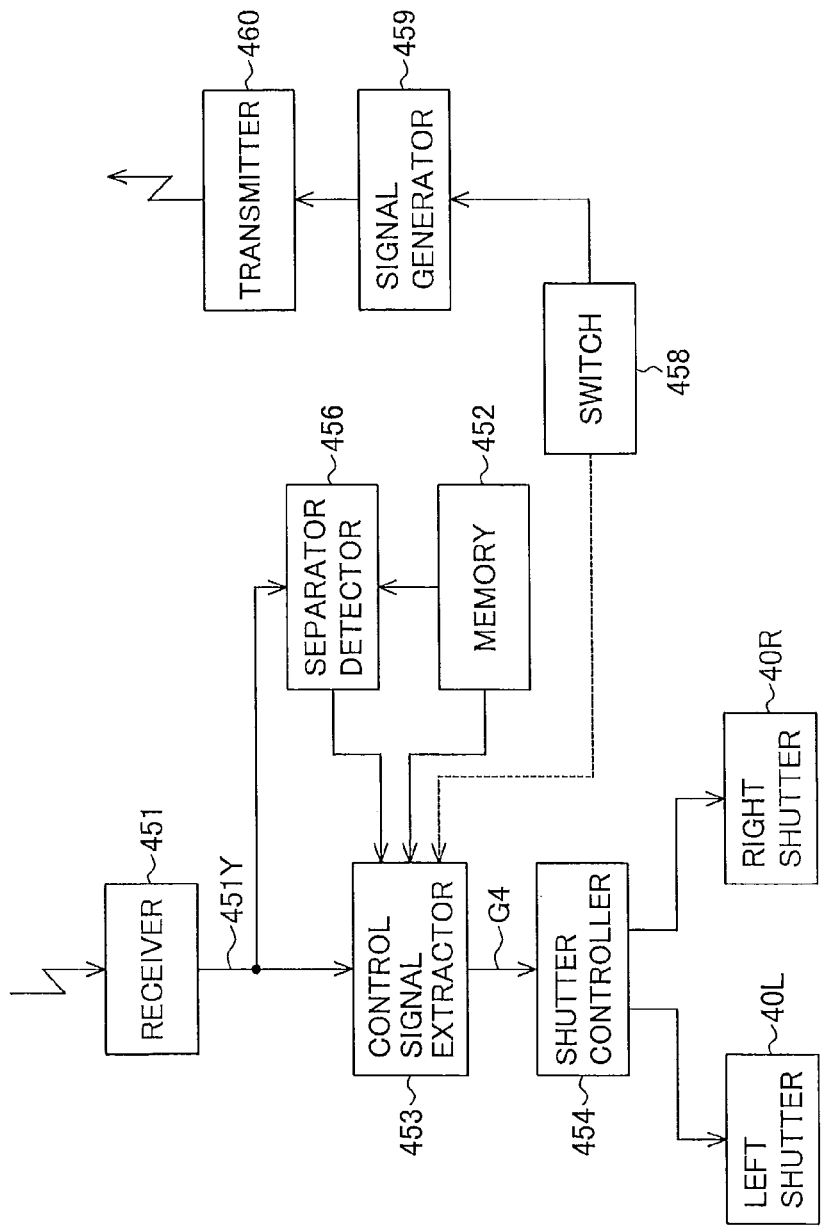
FIG. 21 is a block diagram showing another example of the functional configuration of the glasses in the fourth embodiment.

The glasses may also have a switch for selecting the high, medium, or low stereoscopic tolerance level. When the switch position is changed, the glasses may send corresponding information to the video viewing apparatus, and the information in the memory 22m may be rewritten accordingly. Referring to FIG. 21, in this case the glasses are provided with a switch 458 for setting the tolerance level, a signal generator 459 for generating a signal corresponding to the position of the switch 458, and a transmitter 460 for transmitting the signal generated by the signal generator 459. When the switch 458 is provided, the information in memory 452 may also be rewritten in accordance with the position of the switch 458; alternatively, information indicating the stereoscopic tolerance level may be supplied to the control signal extractor 453 directly from the switch 458, as indicated by the dotted arrow (instead of being supplied from the memory 452).

The example described above used an eight-bit separator SPR, three-bit identifiers GID1 to GID6, and one-bit control codes PI indicating whether to allow stereoscopic viewing, but different bit lengths may be used for any of these items. The glasses control signal G2 may include error correction information instead of being simply a repetition of the separator SPR, identifiers GID, and codes PI as described above.

The signal output unit 26 in the third embodiment may have the same functions and perform the same operations as the transmitter 22 to which the fourth embodiment is applied, generating a display-device control signal G3 which is sent through the display device 3 to the glasses 4.

Alternatively, the signal output unit 26 may only generate numeric strings including the glasses identifiers GID and codes PI indicating whether the viewers are allowed to view stereoscopic video and may send these numeric strings to the display device 3 as the display-device control signal G3. The display device 3 may then generate a separator SPR, generate a control signal G2 including sequences of the separator SPR and control data CND, and send the control signal G2 to the glasses 4.

Because of the above arrangements, the fourth embodiment can be controlled so that when a plurality of viewers watch the same stereoscopic video display simultaneously, they see stereoscopic video or two-dimensional video according to their individual stereoscopic viewing tolerances. Since the numeric string making up the control signal is sent repeatedly, it is tested repeatedly in the glasses, so the glasses are unlikely to malfunction because of electrical noise.

Fifth Embodiment

A fifth embodiment will now be described. In the first to third embodiments, the invention was described as being realized by providing one coefficient converter for each factor affecting a viewer watching stereoscopic video. In the fifth embodiment, it will be described as providing separate coefficient converters for different levels of the viewer's stereoscopic tolerance to a single factor.

Figure 22:
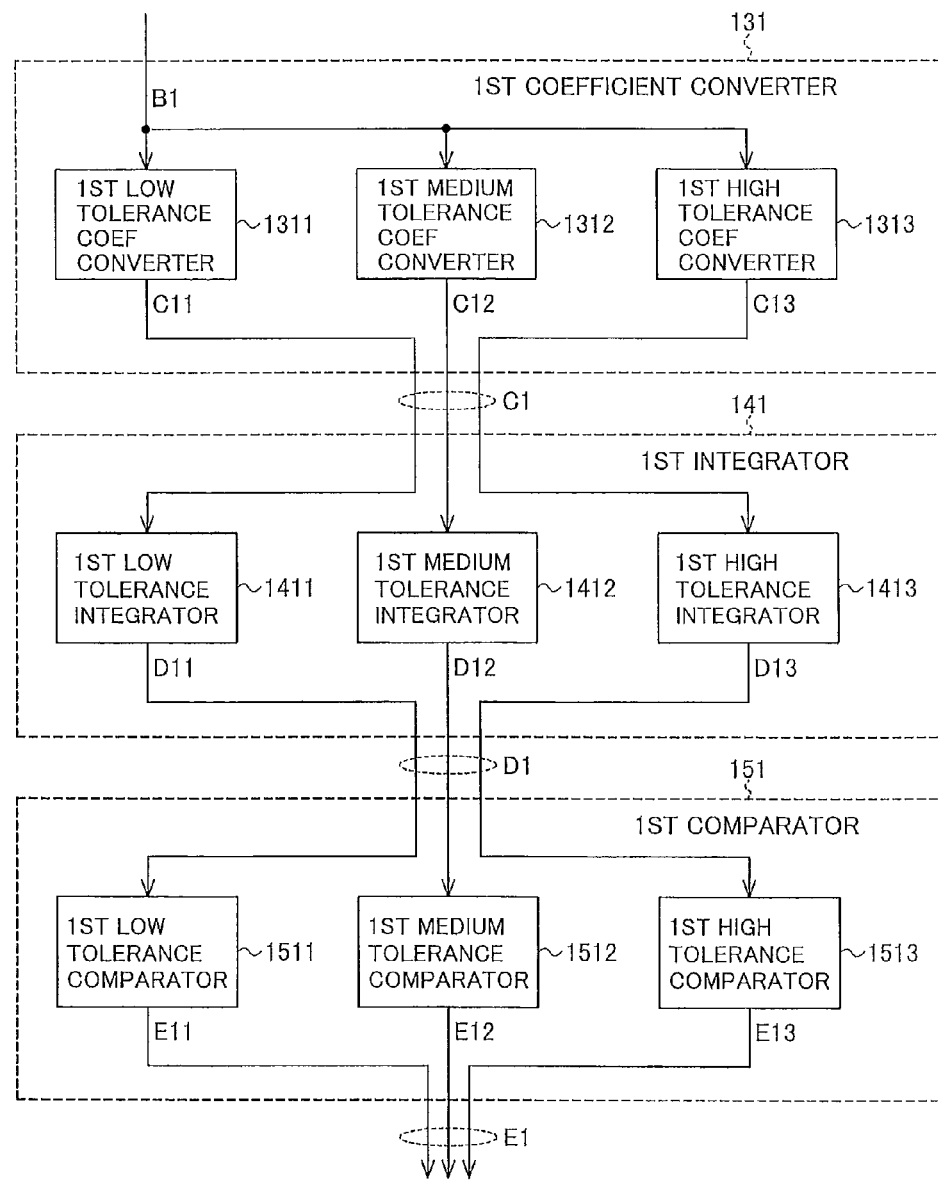
FIG. 22 is a block diagram showing the circuits that process the first factor information in the video viewing apparatus in a fifth embodiment of the invention.

First the operations related to rapidly blinking bright points, which are the first factor in the effect of stereoscopic viewing on the viewer, will be described with reference to FIG. 22. In the first coefficient converter 131 described in the first embodiment, the fifth embodiment provides a first low tolerance coefficient converter 1311 for viewers with low levels of tolerance to the first factor, a first medium tolerance coefficient converter 1312 for viewers with medium levels of tolerance to the first factor, and a first high tolerance coefficient converter 1313 for viewers with high levels of tolerance to the first factor. Each of the first low, medium, and high tolerance coefficient converters 1311, 1312, 1313 receives the first factor information B1 output from the first factor extractor 121.

The first low tolerance coefficient converter 1311 generates, from the first factor information B1, a low tolerance first effect coefficient C11 indicating the degree of effect on a viewer with a low level of tolerance to the first factor in a predetermined unit time.

The first medium tolerance coefficient converter 1312 generates, from the first factor information B1, a medium tolerance first effect coefficient C12 indicating the degree of effect on a viewer with a medium level of tolerance to the first factor in a predetermined unit time.

The first high tolerance coefficient converter 1313 generates, from the first factor information B1, a high tolerance first effect coefficient C13 indicating the degree of effect on a viewer with a high level of tolerance to the first factor in a predetermined unit time.

The low tolerance first effect coefficient C11, medium tolerance first effect coefficient C12, and high tolerance first effect coefficient C13 correspond to the first effect coefficient C1 in the first embodiment, and are output to the first integrator 141.

In the first integrator 141 described in the first embodiment, the fifth embodiment provides a first low tolerance integrator 1411 for viewers with low levels of tolerance to the first factor, a first medium tolerance integrator 1412 for viewers with medium levels of tolerance to the first factor, and a first high tolerance integrator 1413 for viewers with high levels of tolerance to the first factor. The first low, medium, and high tolerance integrators 1411, 1412, and 1413 receive the low tolerance first effect coefficient C11, medium tolerance first effect coefficient C12, and high tolerance first effect coefficient C13, respectively, from the first low, medium, and high tolerance coefficient converters 1311, 1312, 1313.

The first low tolerance integrator 1411 integrates the low tolerance first effect coefficient C11 over the unit time, generates a first low tolerance integrated value D11, and outputs this value to the first low tolerance comparator 1511 in the first comparator 151.

The first medium tolerance integrator 1412 integrates the medium tolerance first effect coefficient C12 over the unit time, generates a first medium tolerance integrated value D12, and outputs this value to the first medium tolerance comparator 1512 in the first comparator 151.

The first high tolerance integrator 1413 integrates the high tolerance first effect coefficient C13 over the unit time, generates a first high tolerance integrated value D13, and outputs this value to the first high tolerance comparator 1513 in the first comparator 151.

The first low tolerance integrated value D11, first medium tolerance integrated value D12, and first high tolerance integrated value D13 correspond to the first integrated value D1 in the first embodiment.

The first comparator 151 in the fifth embodiment is identical to the first comparator 151 described in the first embodiment. The low, medium, and high tolerance comparators 1511, 1512, 1513 in the first comparator 151 in the first embodiment are equivalent to the first low, medium, and high tolerance comparators 1511, 1512, 1513 in the first comparator 151 in the fifth embodiment.

Figure 23:
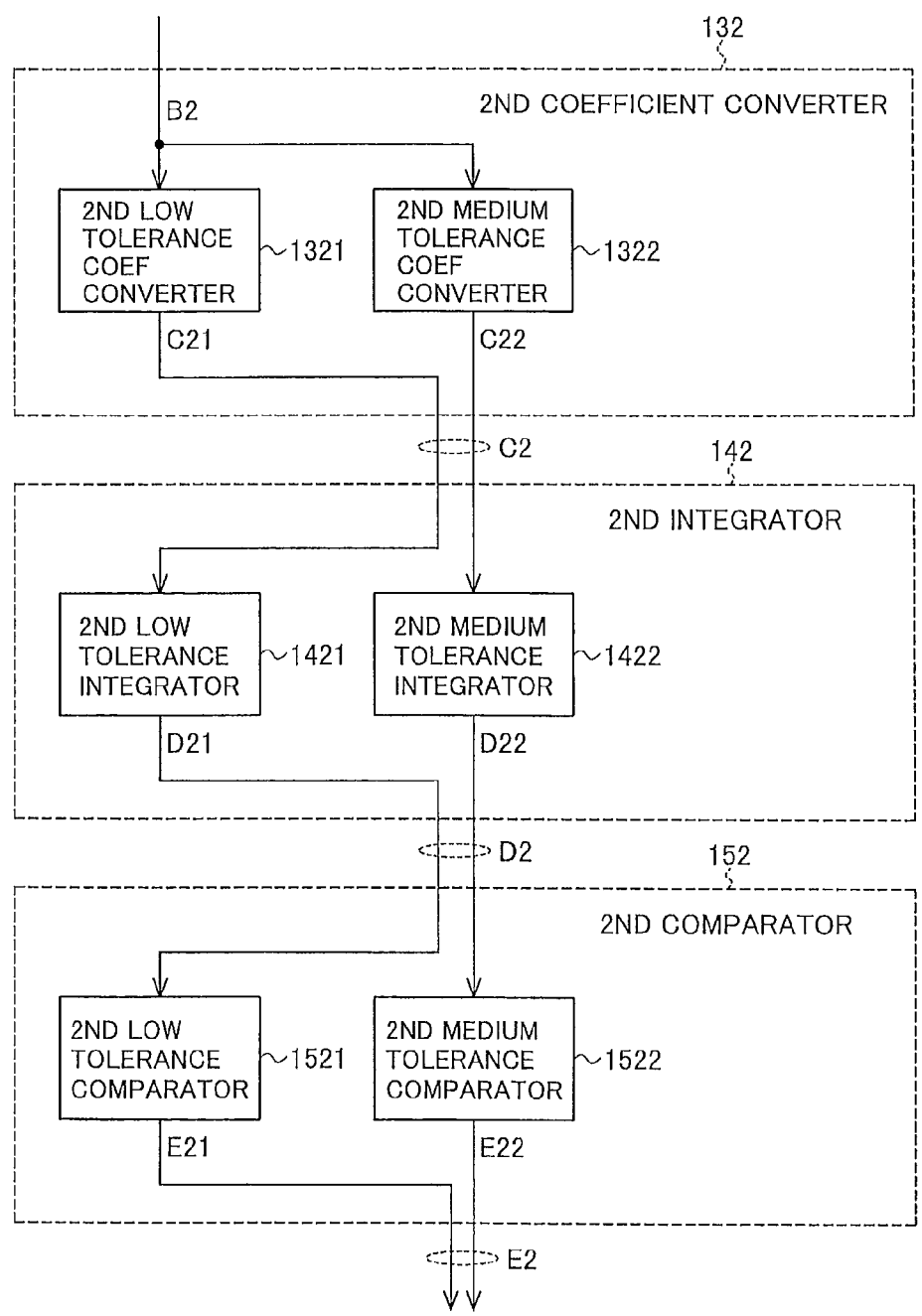
FIG. 23 is a block diagram showing the circuits that process the second factor information in the video viewing apparatus in the fifth embodiment.

Next the operations related to broad areas of high contrast, which is the second factor in the effect of stereoscopic viewing on the viewer, will be described with reference to FIG. 23. In the second coefficient converter 132 described in the first embodiment, the fifth embodiment provides a second low tolerance coefficient converter 1321 for viewers with low levels of tolerance to the second factor and a second medium tolerance coefficient converter 1322 for viewers with medium levels of tolerance to the second factor. The second low tolerance coefficient converter 1321 and second medium tolerance coefficient converter 1322 receive the second factor information B2 output from the second factor extractor 122.

The second low tolerance coefficient converter 1321 generates, from the second factor information B2, a low tolerance second effect coefficient C21 indicating the degree of effect on a viewer with a low level of tolerance to the second factor in a predetermined unit time.

The second medium tolerance coefficient converter 1322 generates, from the second factor information B2, a medium tolerance second effect coefficient C22 indicating the degree of effect on a viewer with a medium level of tolerance to the second factor in a predetermined unit time.

The low tolerance second effect coefficient C21 and medium tolerance second effect coefficient C22 correspond to the second effect coefficient C2 in the first embodiment and are output to the second integrator 142.

In the second integrator 142 described in the first embodiment, the fifth embodiment also provides a second low tolerance integrator 1421 for viewers with low levels of tolerance to the second factor and a second medium tolerance integrator 1422 for viewers with medium levels of tolerance to the second factor. The second low tolerance integrator 1421 and second medium tolerance integrator 1422 receive the low tolerance second effect coefficient C21 output from the second low tolerance coefficient converter 1321 and medium tolerance second effect coefficient C22 output from the second medium tolerance coefficient converter 1322.

The second low tolerance integrator 1421 integrates the low tolerance second effect coefficient C21 over the unit time, generates a second low tolerance integrated value D21, and outputs this value to the second low tolerance comparator 1521 in the second comparator 152.

The second medium tolerance integrator 1422 integrates the medium tolerance second effect coefficient C22 over the unit time, generates a second medium tolerance integrated value D22, and outputs this value to the second medium tolerance comparator 1522 in the second comparator 152.

The second low tolerance integrated value D21 and second medium tolerance integrated value D22 correspond to the second integrated value D2 in the first embodiment.

The second comparator 152 in the fifth embodiment is identical to the second comparator 152 described in the first embodiment. The low and medium tolerance comparators 1521, 1522 in the second comparator 152 in the first embodiment are equivalent to the second low and medium tolerance comparators 1521, 1522 in the second comparator 152 in the fifth embodiment.

The processing related to the third factor is the same in the fifth embodiment as in the first embodiment. This is because a large difference in brightness between the left-eye and right-eye images, which is the third factor in the effect of stereoscopic viewing on the viewer, affects only viewers with low levels of stereoscopic tolerance.

Figure 24:
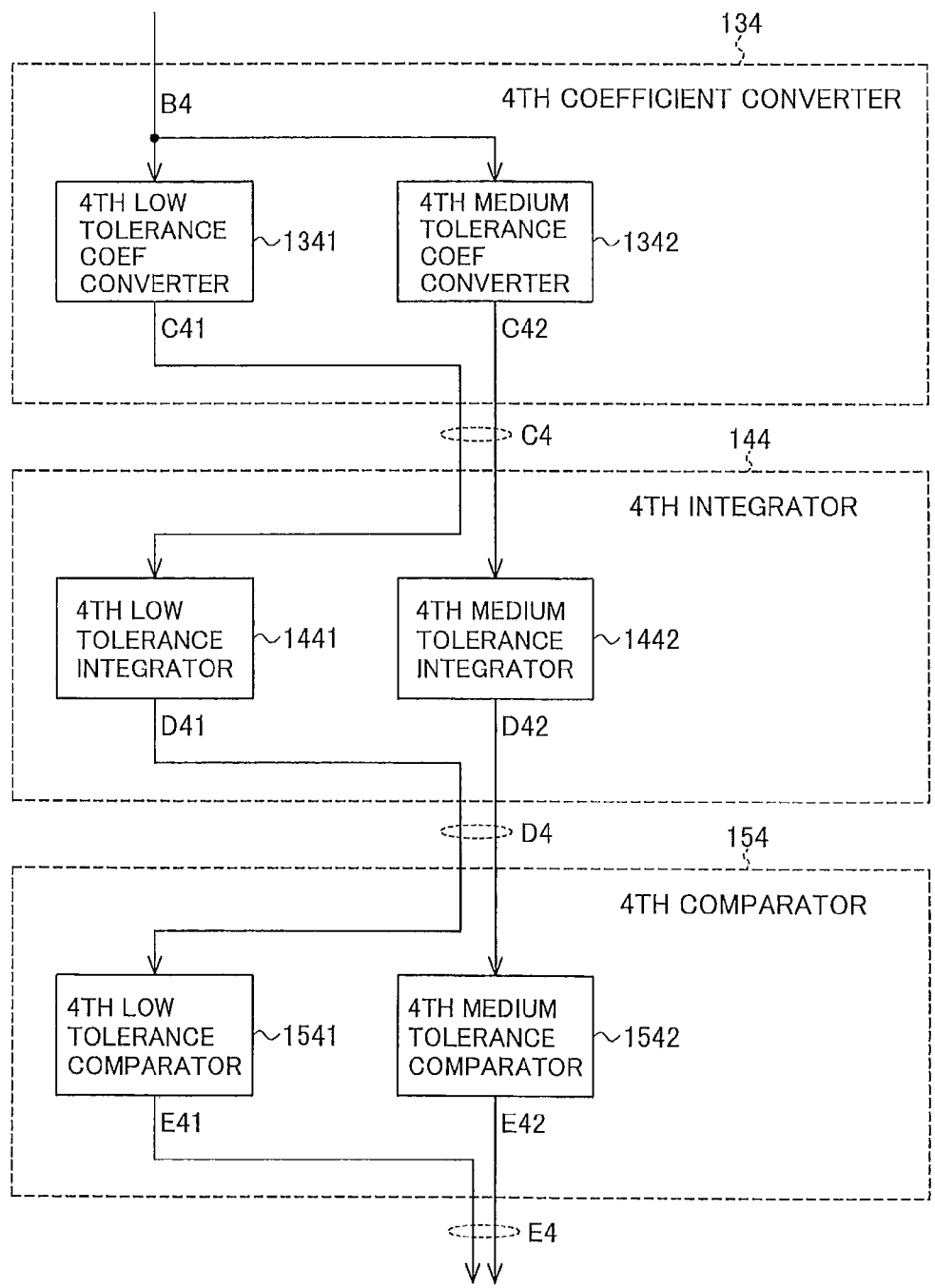
FIG. 24 is a block diagram showing the circuits that process the fourth factor information in the video viewing apparatus in the fifth embodiment.

The operations related to a large stereoscopic vergence angle, which is the fourth factor in the effect of stereoscopic viewing on the viewer, will be described with reference to FIG. 24. In the fourth coefficient converter 134 described in the first embodiment, the fifth embodiment provides a fourth low tolerance coefficient converter 1341 for viewers with low levels of tolerance to the fourth factor and a fourth medium tolerance coefficient converter 1342 for viewers with medium levels of tolerance to the fourth factor. The fourth low tolerance coefficient converter 1341 and fourth medium tolerance coefficient converter 1342 receive the fourth factor information B4 output from the fourth factor extractor 124.

The fourth low tolerance coefficient converter 1341 generates a low tolerance fourth effect coefficient C41 indicating the degree of effect on a viewer with a low level of tolerance to the fourth factor in a predetermined unit time.

The fourth medium tolerance coefficient converter 1342 generates a medium tolerance fourth effect coefficient C42 indicating the degree of effect on a viewer with a medium level of tolerance to the fourth factor in a predetermined unit time.

The low tolerance fourth effect coefficient C41 and the medium tolerance fourth effect coefficient C42 correspond to the fourth effect coefficient C4 in the first embodiment and are output to the fourth integrator 144.

In the fourth integrator 144 described in the first embodiment, the fifth embodiment also provides a fourth low tolerance integrator 1441 for viewers with low levels of tolerance to the fourth factor and a fourth medium tolerance integrator 1442 for viewers with medium levels of tolerance to the fourth factor. The fourth low tolerance integrator 1441 and fourth medium tolerance integrator 1442 receive the low tolerance fourth effect coefficient C41 and medium tolerance fourth effect coefficient C42, respectively.

The fourth low tolerance integrator 1441 integrates the low tolerance fourth effect coefficient C41 over the unit time, generates a fourth low tolerance integrated value D41, and outputs this value to the fourth low tolerance comparator 1541 in the fourth comparator 154.

The fourth medium tolerance integrator 1442 integrates the medium tolerance fourth effect coefficient C42 over the unit time, generates a fourth medium tolerance integrated value D42, and outputs this value to the fourth medium tolerance comparator 1542 in the fourth comparator 154.

The fourth low tolerance integrated value D41 and fourth medium tolerance integrated value D42 correspond to the fourth integrated value D4 in the first embodiment.

The fourth comparator 154 is identical to the fourth comparator 154 in the first embodiment. The low and medium tolerance comparators 1541, 1542 in the fourth comparator 154 in the first embodiment are equivalent to the fourth low and medium tolerance comparators 1541, 1542 in the fourth comparator 154 in the fifth embodiment.

A feature of the fifth embodiment is that separate coefficient converters are provided for some or all of the different levels of tolerance to each factor affecting the viewer.

Because of the above arrangements, the fifth embodiment can be controlled so that when a plurality of viewers watch the same stereoscopic video display simultaneously, they see stereoscopic video or two-dimensional video according to their individual stereoscopic viewing tolerances. In addition, the cumulative intensity at which viewers of each tolerance level are affected can be controlled independently.

Sixth Embodiment

To reduce (band-compress) the amount of information in stereoscopic video content, it is possible to transmit or store only the video data for one image (e.g., the video data for the left-eye image), referred to below as the first image, together with data expressing the difference between the left-eye image and the right-eye image. When the content is reproduced, the video data for the second image (e.g., the video data for the right-eye image) are generated from the video data for the first image and the data expressing the difference. When a person viewing this type of content is switched over to two-dimensional viewing because continued stereoscopic viewing would inadvisable, the left and right shutters 40L, 40R in the glasses are controlled so that both are open while the first image is being output from the display device, and the first image enters both eyes. While the second image for the eye is being output from the display device, both shutters are closed, so that two-dimensional video is seen only with the first image. This is done because the second image, being generated by using the difference data, is of lower quality than the first image. Displaying the first image to both eyes permits higher-quality video viewing.

Seventh Embodiment

The glasses in this embodiment are provided with a switch. When a viewer is switched over to two-dimensional viewing because, from the viewer's stereoscopic viewing tolerance, it is deemed inadvisable for the viewing of stereoscopic video to continue, the switch can select between controlling the glasses so that (1) the left-eye shutter 40L and right-eye shutter 40R are both open when the left-eye image is output from the display device, so that the left-eye image enters both eyes, and both shutters are closed when the right-eye image is output from the display device, or (2) the left-eye shutter 40L and right-eye shutter 40R are both open when the right-eye image is output from the display device, so that the right-eye image enters both eyes, and both shutters are closed when the left-eye image is output from the display device.

Figure 25:
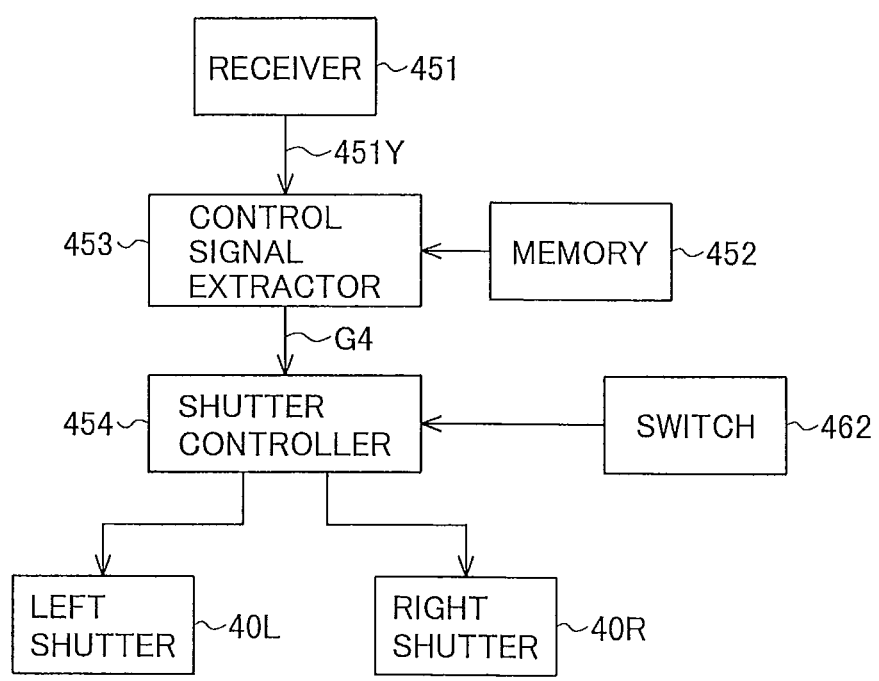
FIG. 25 is a block diagram showing an example of the functional configuration of the glasses in a seventh embodiment of the invention.

The glasses in this embodiment have the structure shown in FIG. 25. The glasses in FIG. 25 are generally the same as in FIG. 16, but have an additional switch 462. In two-dimensional video viewing, from the state of this switch 462, the shutter controller 454 selects whether to open the shutters only while the left-eye image is being displayed or only while the right-eye image is being displayed.

Because of the above arrangement, when the viewer is switched over to two-dimensional viewing because, from the viewer's stereoscopic viewing tolerance, it is deemed inadvisable for the viewing of stereoscopic video to continue, the seventh embodiment permits the viewer to view whichever two-dimensional video image the viewer prefers.

Eighth Embodiment

In the eighth embodiment of the invention, the shutters of the glasses worn by the viewer are opened and closed at different timings in stereoscopic video viewing and two-dimensional video viewing.

FIG. 26A shows the sequence of timings at which the display device displays the left-eye and right-eye images of the stereoscopic video. In stereoscopic viewing, to prevent either eye from seeing the image intended for the other eye, each shutter is controlled so that the period during which it is open is offset from the times of switchover between the left-eye and right-eye images by a margin $\Delta 1$, as shown in FIGS. 26B and 26C. Compared with the period during which the left-eye or right-eye image is displayed, the period during which the shutter is opened to allow the image to be seen starts later and ends earlier. When a viewer is switched from stereoscopic viewing to two-dimensional viewing because the viewer's stereoscopic viewing tolerance has been exceeded, however, it is particularly important to avoid any type of stereoscopic effect. Accordingly, after a switchover to two-dimensional viewing, each shutter is controlled so that the period during which it is open is offset from the times of switchover between the left-eye and right-eye images by a margin $\Delta 2$ larger than margin $\Delta 1$ ($\Delta 1 < \Delta 2$), as shown in FIGS. 26D and 26E (that is, the shutter opens later and closes earlier than during stereoscopic viewing). This control process may be carried out by, for example, the shutter controller 454 in the glasses. In FIGS. 26D and 26E two-dimensional video viewing is carried out by showing the left-eye image to both eyes, but the right-eye image may be used instead, with similar timings.

In any case, all that is necessary is for the timings to be controlled so that the margin (Δ2) between the shutter switching timings in the glasses and the timings of the switchovers between the left-eye and right-eye images in two-dimensional video viewing is larger than the margin (Δ1) between the shutter switching timings in the glasses and the timings of the switchovers between the left-eye and right-eye images in stereoscopic video viewing.

Because of the above arrangement, the eighth embodiment can eliminate crosstalk when the viewer is switched from stereoscopic viewing to two-dimensional viewing, and can thereby reduce the stereoscopic video effects on the viewer.

Ninth Embodiment

In the ninth embodiment of the invention, when even viewers with a high stereoscopic tolerance level are switched from stereoscopic video viewing to two-dimensional video viewing, the video decoder 21 described in the second or third embodiment switches from output of a stereoscopic video signal to output of a two-dimensional video signal as the video signal A0, and both shutters of the viewers' glasses 4 are kept constantly open.

Because of the above arrangement, the ninth embodiment can eliminate the effect of left-eye-right-eye crosstalk on the viewer. In addition, high image brightness can be maintained on the screen and viewers can watch the video image without wearing glasses.

Tenth Embodiment

In the tenth embodiment, each pair of glasses displays one, some, or all of the following information:
(1) whether the glasses are for viewers with low stereoscopic tolerance levels;
(2) whether the glasses are for viewers with medium stereoscopic tolerance levels;
(3) whether the glasses are for viewers with high stereoscopic tolerance levels;
(4) whether the left-eye images are displayed after stereoscopic video viewing is switched to two-dimensional video viewing;
(5) whether the right-eye images are displayed after stereoscopic video viewing is switched to two-dimensional video viewing;
(6) whether the glasses control is held fixed from the outset for two-dimensional video viewing only.

The information can be indicated by letters or symbols on the outer surface of the glasses, for example, or by an attached label.

If the degree of tolerance stored in the memory 22m is rewritable, a liquid crystal display unit in a side piece of the glasses, for example, may indicate the information by letters, symbols, or colors.

Figure 27:
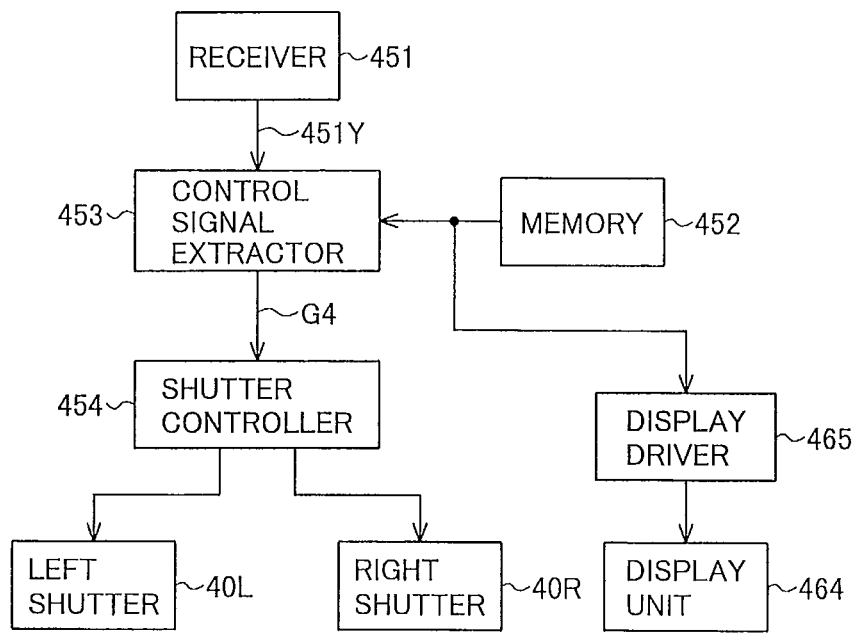
FIG. 27 is a block diagram showing an example of the functional configuration of the glasses in a tenth embodiment of the invention.

Referring to FIG. 27, in this case the glasses have a display unit 464 and a display driver 465 in addition to the elements shown in FIG. 16. The display unit is controlled to display information according to the signal indicating the degree of tolerance stored in the memory 452.

Glasses having a switch for selecting a degree of tolerance may also have a liquid crystal display as described above, and may display information depending on the state of the switch.

Because of the above arrangements, the tenth embodiment can prevent the wrong glasses from being worn.

Eleventh Embodiment

The eleventh embodiment provides the glasses with a switch that forces the selection of two-dimensional viewing or provides the third embodiment with information that always forces two-dimensional viewing and sends this information to the glasses.

Figure 28:
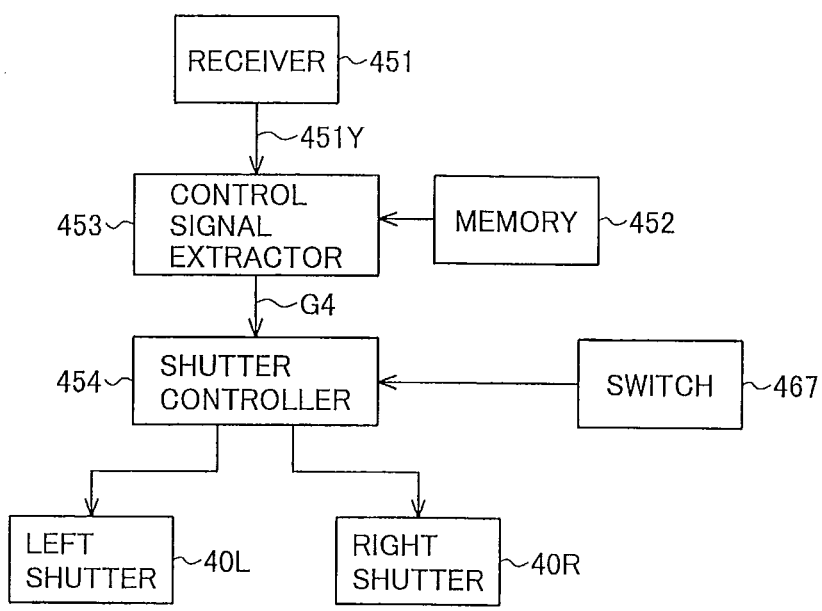
FIG. 28 is a block diagram showing an example of the functional configuration of the glasses in an eleventh embodiment of the invention.

In FIG. 28, the glasses have a switch 467. When the switch 467 demands two-dimensional viewing, the shutter controller 454 controls the shutters 40L, 40R for two-dimensional viewing, regardless of the control signal G4 from the control signal extractor 453.

If information for forcing the selection of two-dimensional viewing is added, the signal output unit 26 in FIG. 17 is configured to supply the display device 3 with a signal G3 for selecting two-dimensional viewing regardless of the information given by the F1 signals.

The eleventh embodiment enables even a viewer with impaired vision in one eye to watch a stereoscopic video at the same time as other viewers.

Twelfth Embodiment

The twelfth embodiment differs from the first to eleventh embodiments in that the hysteresis function is provided in the glasses instead of being provided in the comparators. The comparators output the results of comparison with the thresholds directly, and the limitation determiner 16 outputs viewing limitation signals based on the effect signals indicating the comparison results. The glasses may be internally configured so that once two-dimensional viewing is recommended by the viewing limitation signal, even if the glasses control signal G2 changes to allow stereoscopic viewing, the glasses maintain two-dimensional viewing until video viewing is stopped or ends.

In glasses configured as shown in FIG. 16, for example, after the shutter controller 454 is switched to operate the shutters in the two-dimensional mode in accordance with control signal G4, even if control signal G4 reverts to the state that allows stereoscopic viewing, the shutter controller 454 may maintain the two-dimensional mode.

Thirteenth Embodiment

The thirteenth embodiment is identical to the twelfth embodiment except that the recovery from a transition to the level at which two-dimensional video viewing is recommended is effected by a switch.

Figure 29:
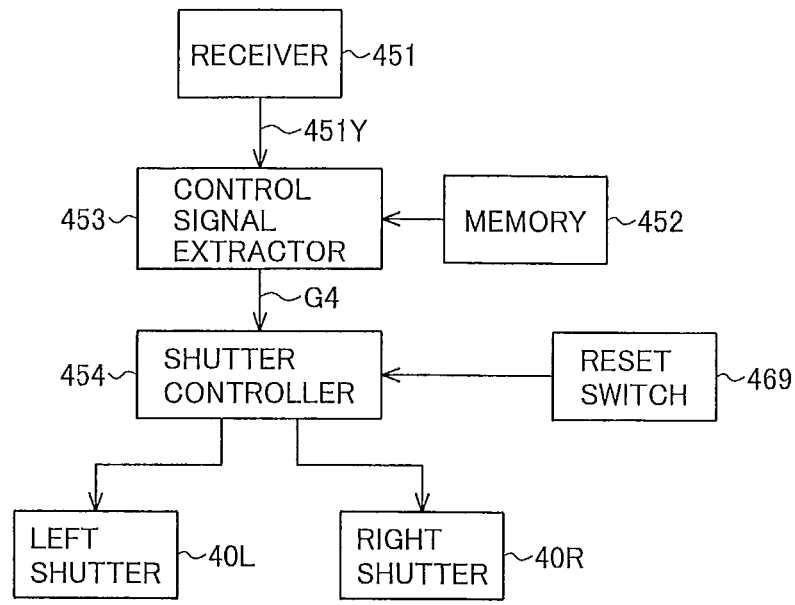
FIG. 29 is a block diagram showing an example of the functional configuration of the glasses in a thirteenth embodiment of the invention.

An exemplary configuration of a pair of glasses equipped with a switch is shown in FIG. 29. The glasses in FIG. 29 are generally the same as the glasses shown in FIG. 16 except for the addition of a reset switch 469. If the reset switch 469 specifies a reset, the shutter controller 454 can return to the stereoscopic mode even if it is currently in the two-dimensional mode and can then select either the stereoscopic mode or the two-dimensional mode according to the next control signal G4 output from the control signal extractor 453. If the control signal G4 permits stereoscopic viewing, the shutters are controlled in the stereoscopic mode. If the control signal G4 is then switched to recommend two-dimensional video viewing, the shutters are controlled in the two-dimensional mode, and this state is maintained until the reset switch 469 is operated again, until the current content ends, or until the reproduction of new video content starts. The end of the current video content or the beginning of new video content can be recognized from, for example, a special signal generated and sent to the receiver 451 when the current content ends or the new content starts, or by detection that the receiver 451 does not receive the glasses control signal G2 or glasses frame signal H2 for at least a predetermined period.

Because of the above arrangements, the thirteenth embodiment can be controlled so that when a plurality of viewers watch the same stereoscopic video display simultaneously, they see stereoscopic video or two-dimensional video according to their individual stereoscopic viewing tolerances. In addition, even if a viewer starts using a pair of glasses partway through the content, the stereoscopic effect on the viewer can be controlled according to the viewer's stereoscopic tolerance level.

Fourteenth Embodiment

The fourteenth embodiment is a modification of the first embodiment in which the stereoscopic video viewing limitation notifying device has a switch for controlling the glasses so that the viewer sees two-dimensional video regardless of the state of the warning signal G1 output from the output unit 17.

The switch is provided, for example, on the glasses, and can be operated by a user (the viewer or his or her parents etc.). Glasses with this switch may be configured as shown in FIG. 28.

The fourteenth embodiment enables a viewer to stop watching stereoscopic video and continue watching the content in the two-dimensional mode on the basis of the way the viewer himself or herself feels, regardless of the assessment made by the stereoscopic video viewing limitation notifying device.

The features of the embodiments described above can be combined as long as they do not conflict with one another.

Fifteenth Embodiment

Figure 30:
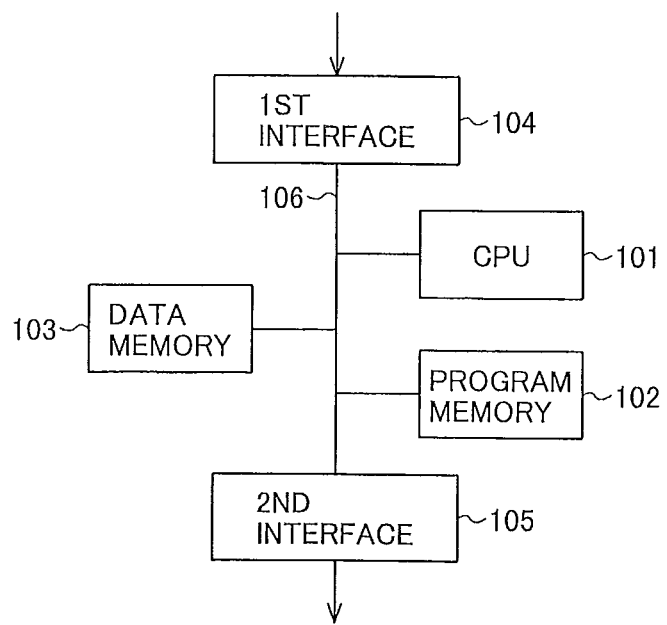
FIG. 30 is a block diagram showing an example of the configuration of a stereoscopic video viewing limiter used to carry out the stereoscopic video viewing limiting method in a fifteenth embodiment of the invention.

The fifteenth embodiment provides a stereoscopic video viewing limitation notifying method that allows stereoscopic viewing in accordance with individual stereoscopic viewing tolerances by alternately showing a right-eye image and a left-eye image with parallax to the corresponding eyes. Referring to FIG. 30, this notifying method can be carried out with an apparatus including a CPU 101, a program memory 102, a data memory 103, a first interface 104, a second interface 105, and a bus 106 that interconnects the other components. The video signal is input from the first interface 104. The CPU 101 operates according to a program stored in the program memory 102, generates a warning signal, described below, and outputs the warning signal through the second interface 105. The data memory 103 is used for temporary storage of the input video signal or data generated during processing in the CPU 101.

Figure 31:
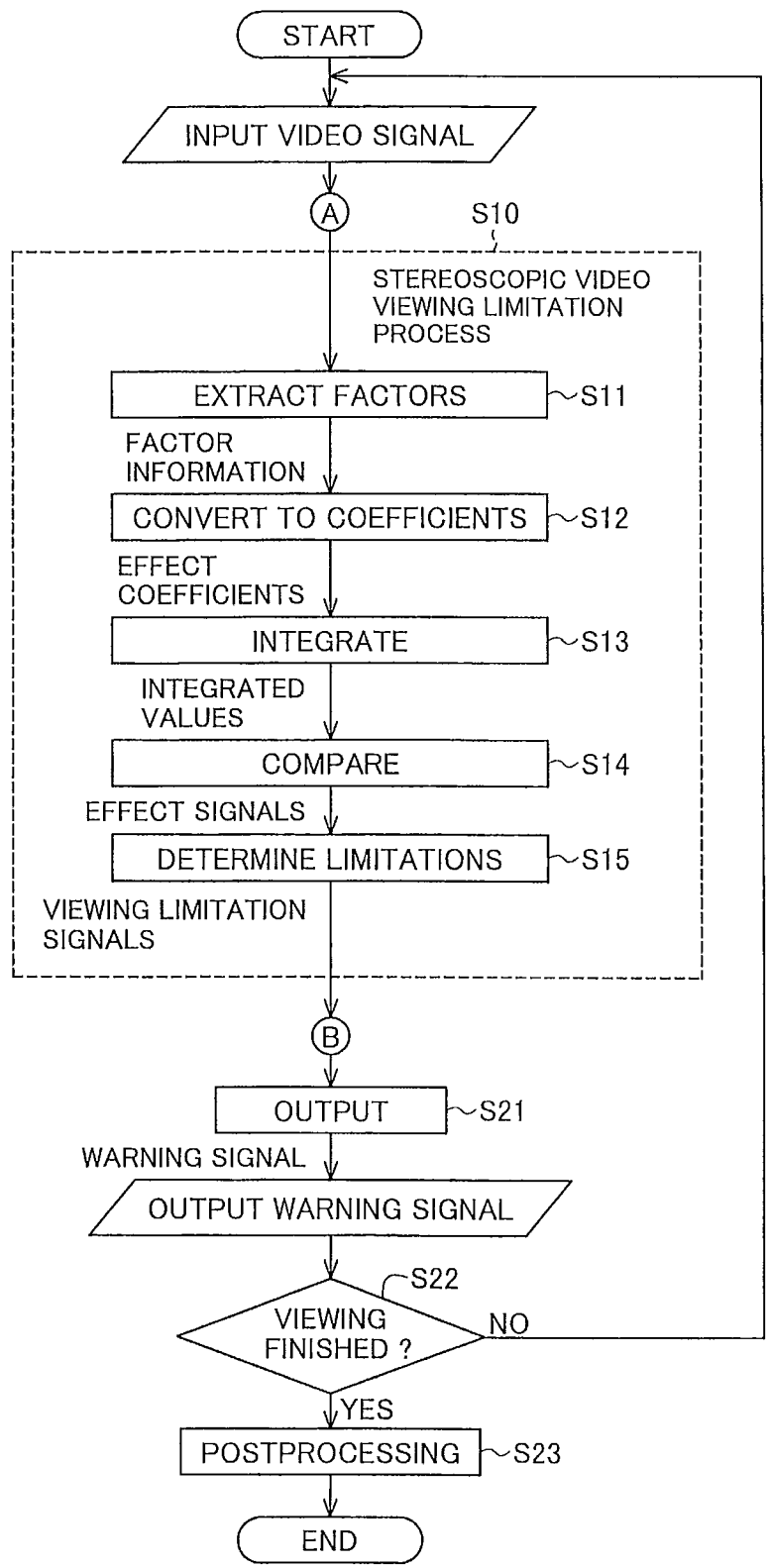
FIG. 31 is a flowchart illustrating the stereoscopic video viewing limitation notification method in the fifteenth embodiment.

FIG. 31 is a flowchart illustrating the overall processing in the fifteenth embodiment.

As shown in FIG. 31, first a video signal A0 representing a right-eye image and a left-eye image with parallax is input and processed in a stereoscopic video viewing limitation step S10.

The stereoscopic video viewing limitation step S10 includes a factor extraction step S11, a coefficient conversion step S12, an integration step S13, a comparison step S14, and a limitation decision step S15. The factor extraction step S11, coefficient conversion step S12, integration step S13, comparison step S14, and limitation decision step S15 correspond to the factor extraction section 12, coefficient conversion section 13, integration section 14, comparison section 15, and limitation determiner 16 in FIG. 1.

In the factor extraction step S11, the following information is extracted from the input video signal: the level of the effect of a rapidly blinking bright point on the viewer, the level of effect of the ratio of a high-contrast area on the viewer, the level of effect of the ratio of a difference in average brightness on the viewer, and the level of effect of a large vergence angle on the viewer, which respectively correspond to the first factor information B1, second factor information B2, third factor information B3, and fourth factor information B4 in the first embodiment. The number of factors is not restricted to four in the fifteenth embodiment. In the description given below, information about the effect of the n-th factor on the viewer will be referred to as n-th factor information.

In the coefficient conversion step S12, effect coefficients such as, for example, the first effect coefficient C1, second effect coefficient C2, third effect coefficient C3, and fourth effect coefficient C4 in the first embodiment are generated on the basis of the factor information.

In the integration step S13, the n-th effect coefficient is integrated while the video signal is being watched, that is, while the loop from the step S22 in FIG. 31 continues, and an n-th integrated value is generated.

Figure 32:
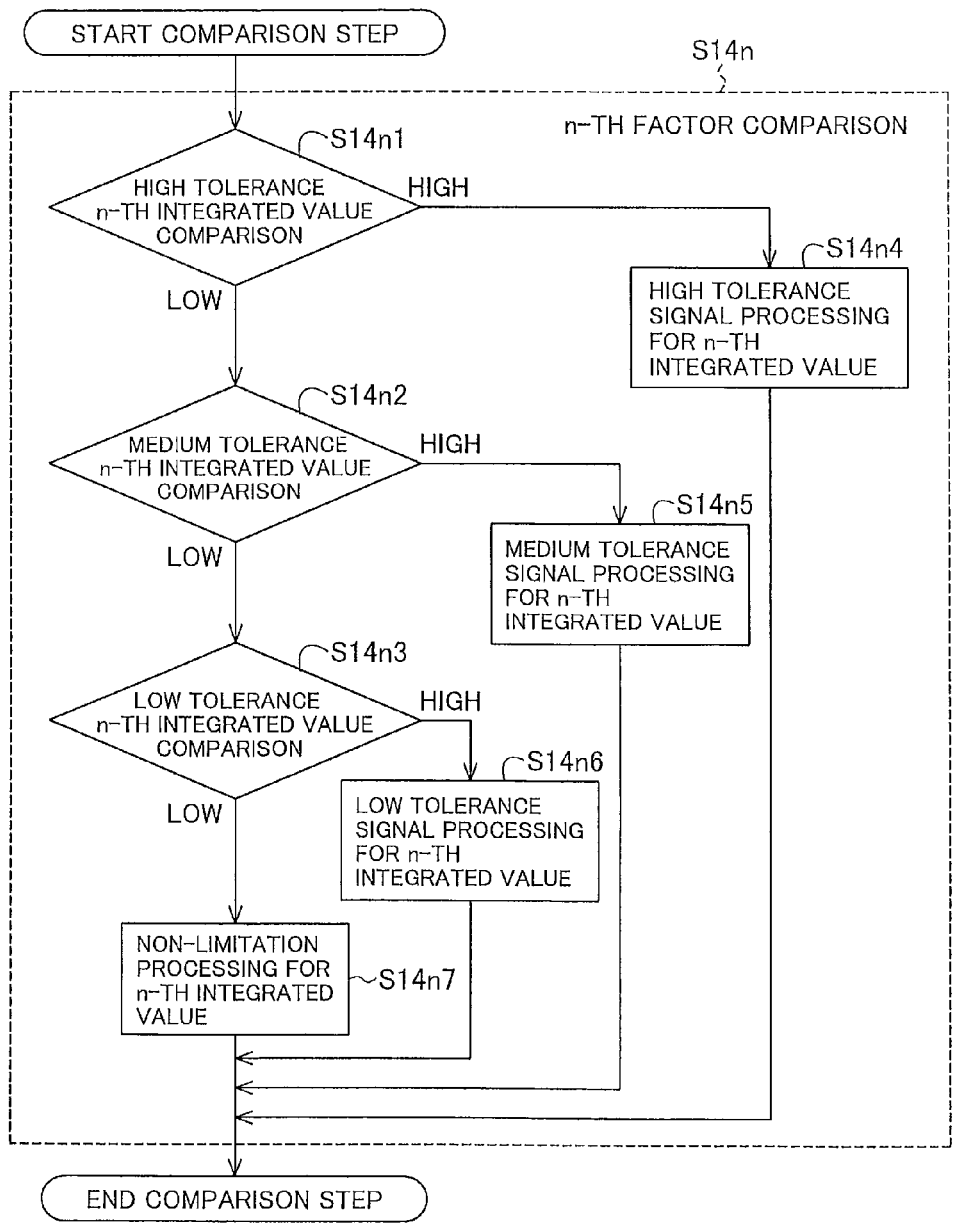
FIG. 32 is a flowchart illustrating the comparison step in FIG. 31.

In the comparison step S14, referring to FIG. 32, the n-th integrated value is compared in a high tolerance n-th integrated value comparison step S14$n$1 with a threshold at which the n-th factor would presumably affect viewers with a high tolerance level. If the n-th integrated value exceeds the threshold at which the n-th factor would presumably affect viewers with a high tolerance level, the process proceeds to a high tolerance n-th integrated value signal processing step S14$n$4. If the n-th integrated value is less than the threshold at which the n-th factor would presumably affect viewers with a high tolerance level, the process proceeds to a medium tolerance n-th integrated value comparison step S14$n$2.

In the medium tolerance n-th integrated value comparison step S14$n$2, the n-th integrated value is compared with a threshold at which the n-th factor would presumably affect viewers with a medium tolerance level. If the n-th integrated value exceeds the threshold at which the n-th factor would presumably affect viewers with a medium tolerance level, the process proceeds to a medium tolerance n-th integrated value signal processing step S14$n$5. If the n-th integrated value is less than the threshold at which the n-th factor would presumably affect viewers with a medium tolerance level, the process proceeds to a low tolerance n-th integrated value comparison step S14$n$3.

In the low tolerance n-th integrated value comparison step S14$n$3, the n-th integrated value is compared with a threshold at which the n-th factor would presumably affect viewers with a low tolerance level. If the n-th integrated value exceeds the threshold at which the n-th factor would presumably affect viewers with a low tolerance level, the process proceeds to a low tolerance n-th integrated value signal processing step S14$n$6. If the n-th integrated value is less than the threshold at which the n-th factor would presumably affect viewers with a low tolerance level, the process proceeds to an n-th integrated value non-limitation processing step S14$n$7.

In the high tolerance n-th integrated value signal processing step S14$n$4, an n-th effect signal is generated that recommends, on the basis of the n-th factor affecting the viewers, that all viewers stop stereoscopic viewing and switch to two-dimensional viewing, and the comparison step related to the n-th factor ends.

In the medium tolerance n-th integrated value signal processing step S14n5, an n-th effect signal that recommends that viewers with middle or low stereoscopic tolerance levels stop stereoscopic viewing and switch to two-dimensional viewing and allows viewers with high stereoscopic tolerance levels to continue stereoscopic viewing is generated, and the comparison step related to the n-th factor ends.

In the low tolerance n-th integrated value signal processing step S14n6, an n-th effect signal that recommends that viewers with low stereoscopic tolerance levels stop stereoscopic viewing and switch to two-dimensional viewing and allows viewers with high or medium stereoscopic tolerance levels to continue stereoscopic viewing is generated, and the comparison step related to the n-th factor ends.

In the n-th integrated value non-limitation processing step S14n7, an n-th effect signal that allows all viewers to watch stereoscopic video is generated, and the comparison step related to the n-th factor ends.

After the effect signal groups related to all factors affecting viewers have been generated, the comparison step S14 in FIG. 31 ends. The effect signal groups are passed to the limitation decision step S15.

Figure 33:
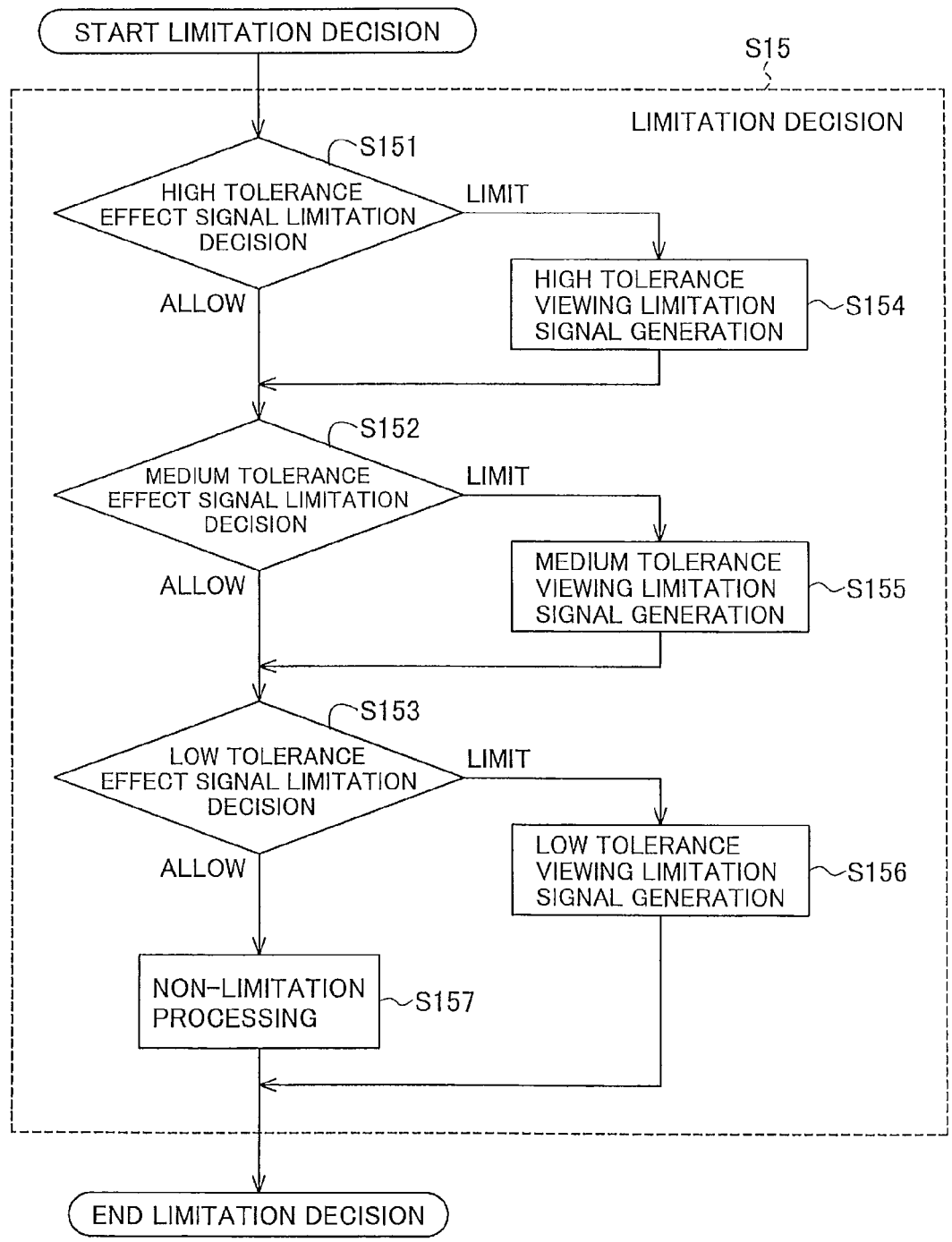
FIG. 33 is a flowchart illustrating the limitation decision step in FIG. 31.

In the limitation decision step S15, referring to FIG. 33, among the effect signals generated in the comparison step S14 to indicate the effects of different factors on viewers watching stereoscopic video, if at least one of effect signals for viewers with high tolerance levels recommends two-dimensional viewing, the process takes the 'limit' branch from a high tolerance effect signal limitation decision step S151 and proceeds to a high tolerance viewing limitation signal generation step S154. If all the effect signals for viewers with high tolerance levels allow stereoscopic viewing, the process takes the 'allow' branch and proceeds to a medium tolerance effect signal limitation decision step S152.

In the medium tolerance effect signal limitation decision step S152, as shown in FIG. 33, among the effect signals indicating the effects of different factors on viewers watching stereoscopic video, if at least one of the effect signals for viewers with medium tolerance levels recommends two-dimensional viewing, the process takes the 'limit' branch and proceeds to a medium tolerance viewing limitation signal generation step S155. If all the effect signals for viewers with medium tolerance levels allow stereoscopic viewing, the process takes the 'allow' branch and proceeds to a low tolerance effect signal limitation decision step S153.

In the low tolerance effect signal limitation decision step S153, among the effect signals indicating the effects of different factors on viewers watching stereoscopic video, if at least one of the effect signals for viewers with low tolerance levels recommends two-dimensional viewing, the process takes the 'limit' branch and proceeds to a low tolerance viewing limitation signal generation step S156. If all the effect signals for viewers with low tolerance levels allow stereoscopic viewing, the process takes the 'allow' branch and proceeds to a non-limitation processing step S157.

The decisions in the high tolerance effect signal limitation decision step S151, medium tolerance effect signal limitation decision step S152, and low tolerance effect signal limitation decision step S153 may take the 'limit' branch in FIG. 33 when, among the effect signals, at least a predetermined number of signals recommend two-dimensional viewing, and may take the 'allow' branch in FIG. 33 when less than the predetermined number of signals recommend two-dimensional viewing.

In the high tolerance viewing limitation signal generation step S154, a viewing limitation signal that advises viewers with high stereoscopic tolerance levels to stop watching stereoscopic images and switch to two-dimensional viewing is generated, and the process proceeds to the medium tolerance effect signal limitation decision step S152.

In the medium tolerance viewing limitation signal generation step S155, a viewing limitation signal that advises viewers with medium stereoscopic tolerance levels to stop watching stereoscopic images and switch to two-dimensional viewing is generated, and the process proceeds to the low tolerance effect signal limitation decision step S153.

In the low tolerance viewing limitation signal generation step S156, a viewing limitation signal that advises viewers with low stereoscopic tolerance levels to stop watching stereoscopic images and switch to two-dimensional viewing is generated. The limitation decision step S15 then ends, and the process proceeds to the output step S21.

In the non-limitation processing step S157, all the generated viewing limitation signals are set to allow stereoscopic viewing. The limitation decision step S15 then ends, and the process proceeds to the output step S21.

In the fifteenth embodiment, the high tolerance effect signal limitation decision step S151, medium tolerance effect signal limitation decision step S152, and low tolerance effect signal limitation decision step S153 are carried out in this order, but these steps may be carried out in a different order.

The group of viewing limitation signals generated in the limitation decision step S15 goes to the output step S21, which corresponds to the output unit 17 in FIG. 1. In the output step S21, a warning signal is generated on the basis of the viewing limitation signals and is sent to the viewer. A further decision step S22 then decides whether stereoscopic viewing has finished (whether the end of the video data, that is, the end of the content, has been reached).

If it is decided in the step S22 that stereoscopic viewing is not finished, the video signal is input, and the processing is repeated from the factor extraction step S11. If it is decided that stereoscopic viewing is finished, registers for holding integrated values and the like are initialized in a postprocessing step S23 to terminate the processing of the stereoscopic video viewing limitation notifying method.

Because of the above arrangements, when a plurality of viewers watch the same stereoscopic video display simultaneously, the fifteenth embodiment enables each viewer to select stereoscopic video viewing or two-dimensional video viewing according to the viewer's individual stereoscopic viewing tolerance.

Sixteenth Embodiment

Figure 34:
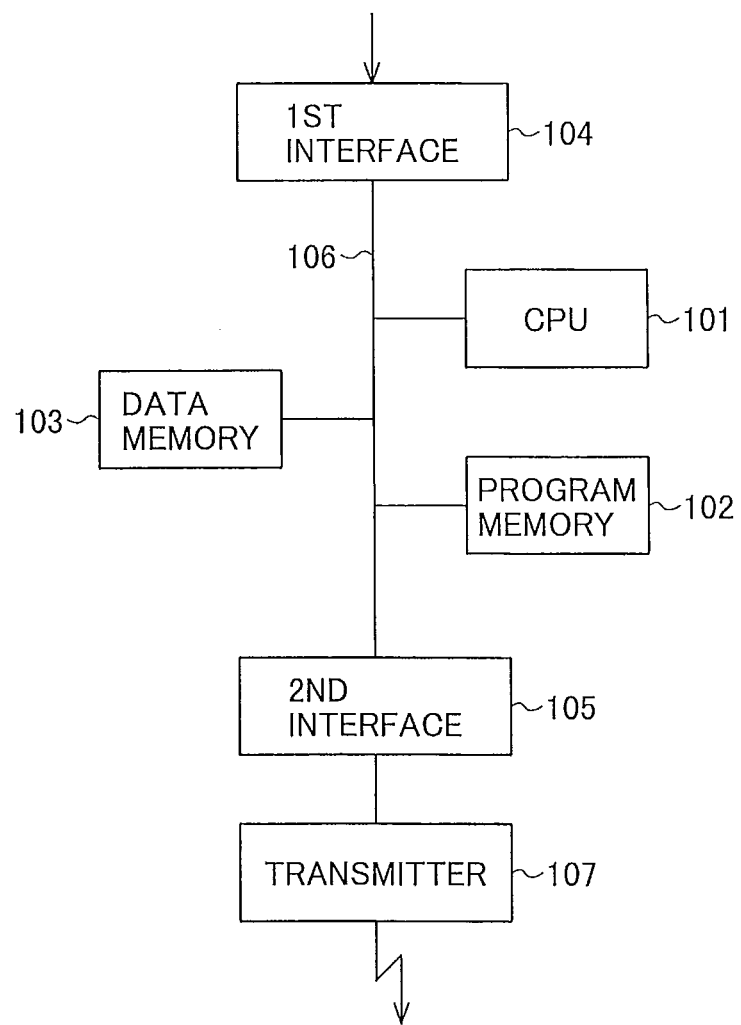
FIG. 34 is a block diagram showing an example of the configuration of a video viewing apparatus used to carry out the stereoscopic video viewing limitation method in a sixteenth embodiment of the invention.

In the sixteenth embodiment, a video viewing method that permits stereoscopic video viewing by displaying a right-eye image and a left-eye image alternately with parallax to the right eye and the left eye respectively, in accordance with individual stereoscopic tolerance levels will be described. This method also uses, for example, the video viewing apparatus shown in FIG. 34 and the glasses shown in FIG. 35. The video viewing apparatus illustrated in FIG. 34 is generally similar to the apparatus illustrated in FIG. 30 but has an additional transmitter 107. The transmitter 107 is connected to the CPU 101 through the second interface 105 and sends signals to the glasses.

Figure 35:
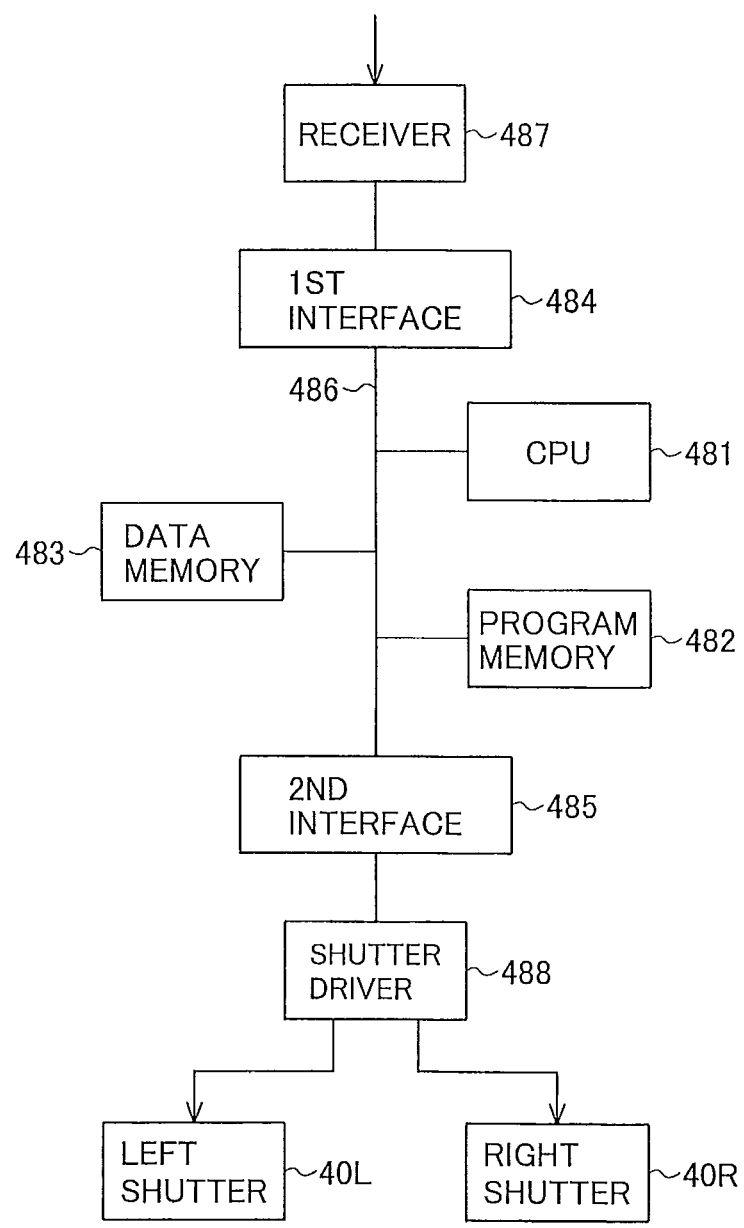
FIG. 35 is a block diagram showing an example of the functional configuration of the glasses used in the sixteenth embodiment.

The glasses illustrated in FIG. 35 include a CPU 481, a program memory 482, a data memory 483, a first interface 484, and a second interface 485 interconnected by a bus 486, and a receiver 487 connected to the bus 486 through the first interface 484. The receiver 487 receives a signal sent from the transmitter 107 of the video viewing apparatus. The received signal is sent through the first interface 484 to the CPU 481.

The CPU 481 operates according to a program stored in the program memory 482. The CPU 481 receives the signal received by the receiver 487 through the first interface 484 and outputs a shutter control signal through the second interface 485. A shutter driver 488 controls the left shutter 40L and right shutter 40R on the basis of the control signal supplied through the second interface 485.

The data memory 483 is used for temporary storage of the input signal or data generated during processing in the CPU 481. The data memory 483 or program memory 482 stores glasses identifiers.

Figure 36:
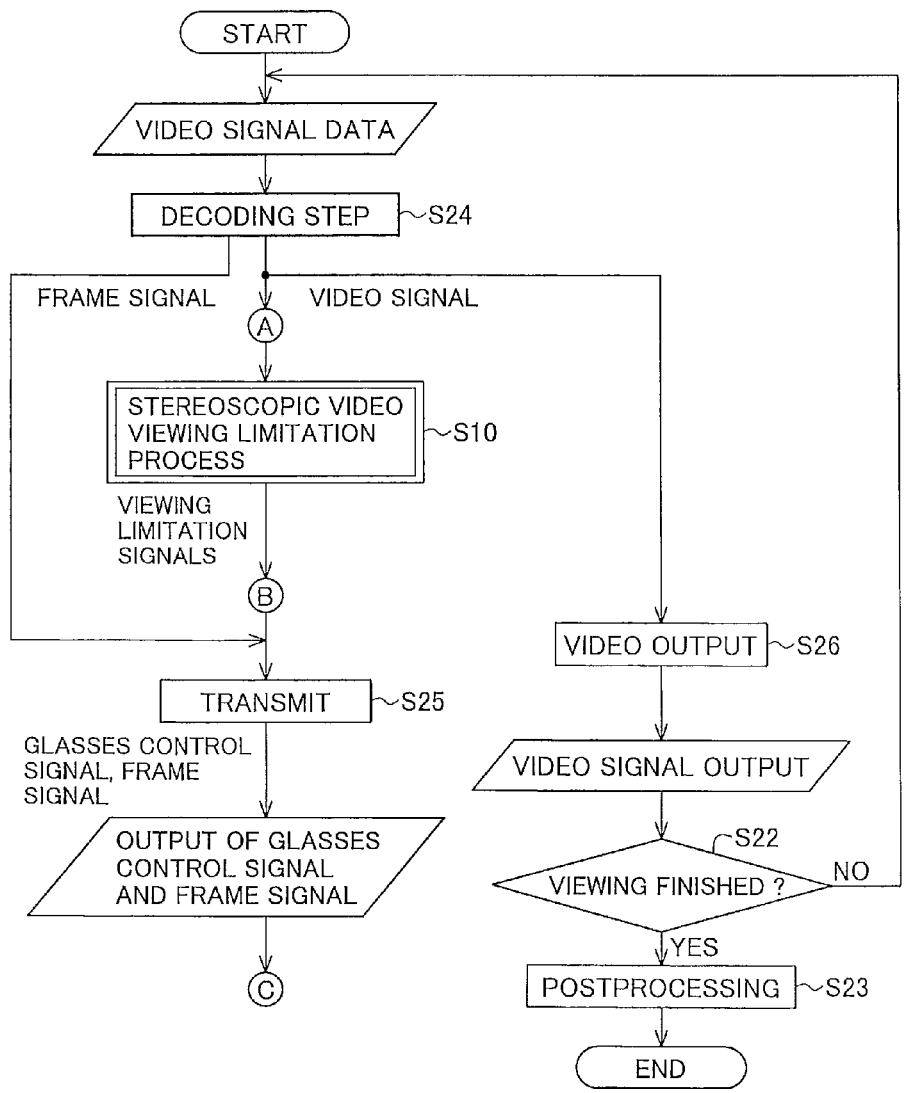
FIG. 36 is a flowchart illustrating the video viewing method in the sixteenth embodiment.

FIG. 36 is a flowchart illustrating the overall processing in the sixteenth embodiment.

In the sixteenth embodiment, video data AD read from an optical disc or supplied through the Internet by a content provider are supplied through the first interface 104 to the CPU 101. In a decoding step S24 shown in FIG. 36, the CPU 101 decrypts the video data AD if the data have been encrypted for copyright protection, decompresses the video data AD if the data have been band-compressed, and generates a video signal A0 alternately representing left-eye and right-eye video images in a time sequence and a frame signal H0 indicating the timings at which the right-eye image and the left-eye image are output.

The video signal A0 generated in the decoding step S24 is used in the stereoscopic video viewing limitation step S10 shown in FIG. 36. The stereoscopic video viewing limitation step S10 includes the process from the factor extraction step S11 to the limitation decision step S15, between the symbols A and B, shown in FIG. 31, and has the same processing content, so it will not be described.

The viewing limitation signal group F1 generated in the stereoscopic video viewing limitation step S10 is used in a transmission step S25.

In the transmission step S25, the same processing is carried out as was carried out by the transmitter 22 described with reference to FIG. 12 in the second embodiment. A glasses control signal G2 is generated on the basis of the viewing limitation signal group F1 generated in the stereoscopic video viewing limitation step S10, and a frame signal H2 is generated on the basis of the frame signal H0 generated in the decoding step S24. The glasses control signal G2 and frame signal H2 are transmitted by radio, infrared, or wireline transmission. The glasses control signal G2 may be a repeated numeric string as in the fourth embodiment.

The video signal A0 generated in the decoding step S24 is processed in a video output step S26 in the same way as by the video output unit 24 in FIG. 12, is thereby converted to a video signal A1 suitable for the display device, and is output to the display device. Whether stereoscopic video viewing is finished (whether the end of the content has been reached) is then decided in a decision step S22.

If it is decided in step S22 that stereoscopic viewing is not finished, video data are input and the processing is repeated from the decoding step S24. If it is decided that stereoscopic video viewing is finished, registers for holding integrated values and the like are initialized in a postprocessing step S23 to terminate the processing of the video viewing method.

Figure 37:
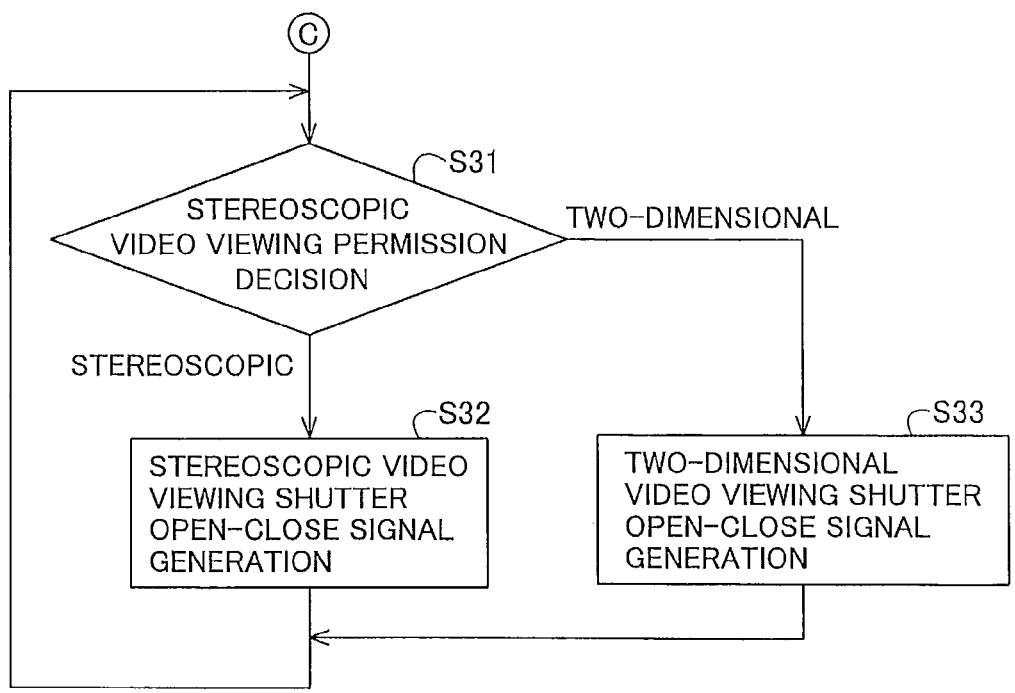
FIG. 37 is a flowchart illustrating the operation of the glasses in the sixteenth embodiment.

The glasses control signal G2 and frame signal H2 transmitted in the transmission step S25 are received in the receiver 487 in the glasses. Referring to FIG. 37, a stereoscopic video viewing permission decision step S31 is carried out in the glasses to decide whether stereoscopic video viewing is allowed. If it is decided in the stereoscopic video viewing permission decision step S31 that stereoscopic video viewing is allowed, the process proceeds to a stereoscopic video viewing shutter open-close signal generation step S32.

If it is decided in the stereoscopic video viewing permission decision step S31 that it would be advisable to switch from stereoscopic video viewing to two-dimensional video viewing, the process proceeds to a two-dimensional video viewing shutter open-close signal generation step S33.

In the stereoscopic video viewing shutter open-close signal generation step S32, the frame signal is used as a signal indicating timings at which the right-eye image and the left-eye image are alternately displayed, and the shutter open-close signal is generated (1) to open the left-eye shutter and close the right-eye shutter of the glasses while the left-eye image is being displayed, so that the left-eye image enters only the viewer's left eye; and (2) to close the left-eye shutter and open the right-eye shutter of the glasses while the right-eye image is being displayed, so that the right-eye image enters only the viewer's right eye.

The shutters in the glasses are driven accordingly. This operation continues until the next glasses control signal and frame signal are input. This process enables the viewer to see stereoscopic video.

In the two-dimensional video viewing shutter open-close signal generation step S33, the frame signal is used as a signal indicating timings at which the right-eye image and the left-eye image are alternately displayed, and the shutter open-close signal is generated (1) to open the left-eye shutter and right-eye shutter of the glasses while the left-eye image is being displayed, so that the left-eye image enters both of the viewer's eyes; and (2) to close the left-eye shutter and right-eye shutter of the glasses while the right-eye image is being displayed, so that the right-eye image does not enter either of the viewer's eyes.

The shutters of the glasses are driven accordingly. This operation continues until the next glasses control signal and frame signal are input. This process enables the viewer to see two-dimensional video instead of stereoscopic video. The same effect can be obtained by showing the right-eye image to both eyes.

Because of the above arrangements, the sixteenth embodiment of the invention can be controlled so that when a plurality of viewers watch the same stereoscopic video display simultaneously, they see stereoscopic video or two-dimensional video according to their individual stereoscopic viewing tolerances. Even if the display device does not have means for transmitting glasses signals, the viewers can watch the stereoscopic video according to their individual stereoscopic viewing tolerances.

Seventeenth Embodiment

In the seventeenth embodiment, another video viewing method that enables stereoscopic video displayed by showing a right-eye image and a left-eye image alternately with parallax to the right eye and the left eye respectively to be watched in accordance with the viewer's individual stereoscopic tolerance level will be described. The method in the seventeenth embodiment can make use of the video viewing apparatus shown in FIG. 34. The overall operation of the seventeenth embodiment is shown in the flowchart in FIG. 38. Signals and steps that have the same functions or perform the same processing as in the fifteenth and sixteenth embodiments are designated by the same names and reference characters, and descriptions will be omitted.

Figure 38:
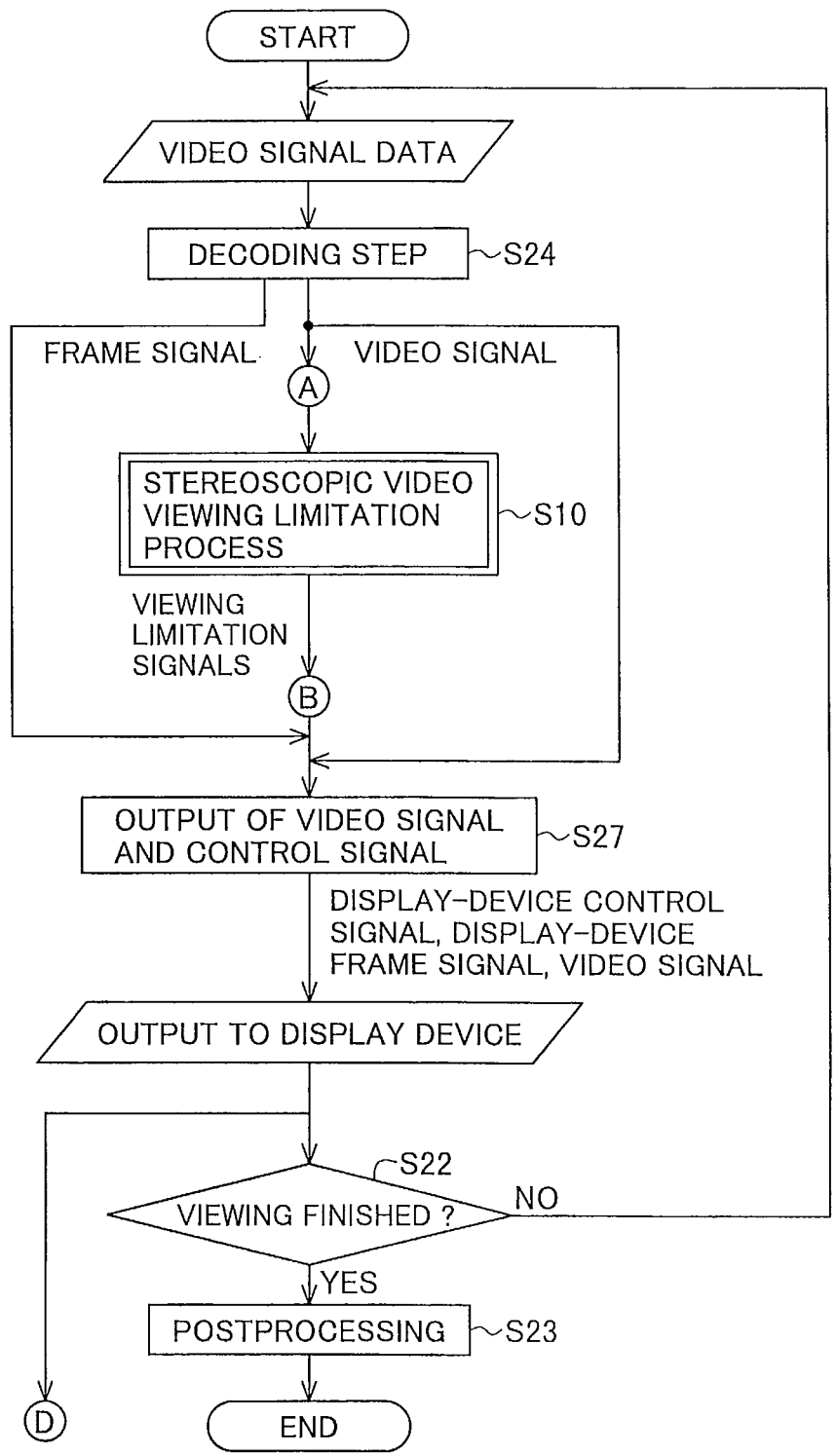
FIG. 38 is a flowchart illustrating the video viewing method in a seventeenth embodiment.

As shown in FIG. 38, the input video data in the seventeenth embodiment are used in a decoding step S24. In the decoding step S24, a video signal A0 alternately representing the left-eye and right-eye video images in a time sequence and a frame signal H0 indicating the timings at which the right-eye image and the left-eye image are output are generated.

The video signal A0 generated in the decoding step S24 is used in a stereoscopic video viewing limitation step S10. In the stereoscopic video viewing limitation step S10, the video signal A0 is subjected to the same processing as described with reference to FIG. 31 in the fifteenth embodiment to generate a group of viewing limitation signals F1. The viewing limitation signals generated in the stereoscopic video viewing limitation step S10 are used in a signal output step S27.

Processing similar to the processing performed by the signal output unit 26 in FIG. 27 is performed in a signal output step S27. A display-device control signal G3 suitable for output of the group of viewing limitation signals F1 to the display device, a display-device frame signal H3 suitable for output of the frame signal H0 to the display device, and a display-device video signal A2 suitable for output of the video signal A0 to the display device are generated from the viewing limitation signal group F1 generated in the stereoscopic video viewing limitation step S10, the frame signal H0, and the video signal A0, and the generated signals are output to the display device.

After the display-device control signal G3, display-device frame signal H3, and display-device video signal A2 are output to the display device, whether stereoscopic video viewing is finished is decided in step S22.

If stereoscopic video viewing is not finished in step S22, the decoding step S24 and subsequent steps are repeated. If stereoscopic video viewing is finished in step S22, registers for holding integrated values and the like are initialized in the postprocessing step S23 to terminate the processing of the video viewing method.

Figure 39:
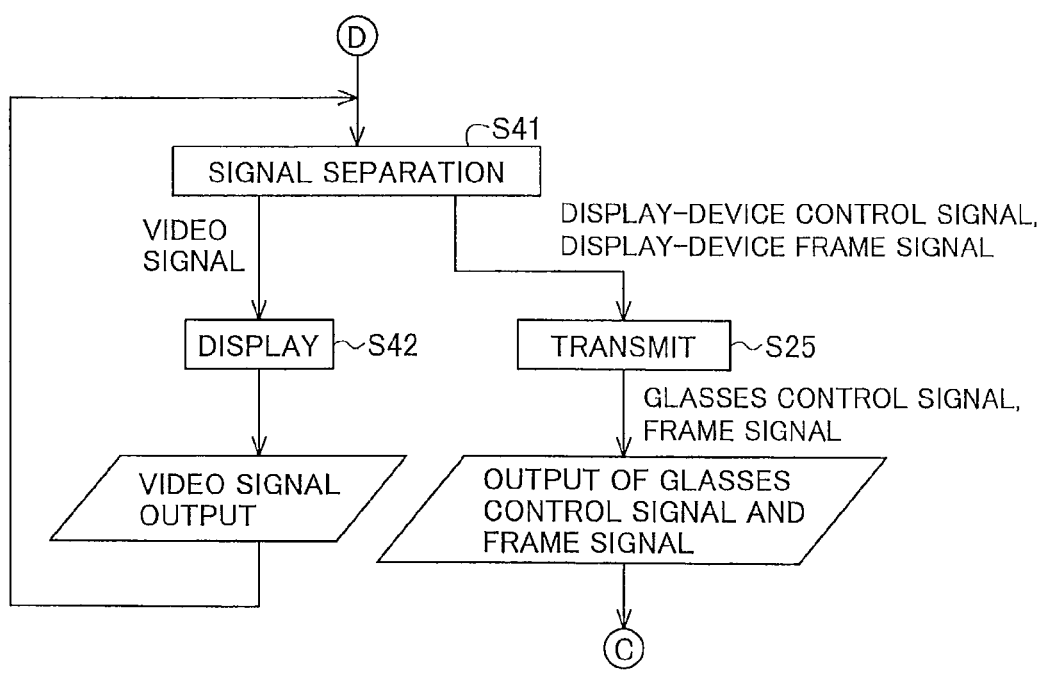
FIG. 39 is a flowchart illustrating the operation of the display device in the seventeenth embodiment.

Referring to FIG. 39, in a signal separation step S41 carried out in the display device when it receives the display-device control signal G3, display-device frame signal H3, and display-device video signal A2 from the signal output step S27, these signals G3, H3, A2 are separated into two paths, the video signal A2 going to a display step S42, the display-device control signal G3 and the display-device frame signal H3 going to a transmission step S25.

In the transmission step S25, a glasses control signal equivalent to the glasses control signal G2 transmitted to the glasses worn by the viewer by radio, infrared, or wireline transmission in the second embodiment (and also denoted G2) is generated from the display-device control signal G3, the display-device frame signal H3 is converted to a frame signal H2, and the glasses control signal G2 and frame signal H2 are transmitted to the glasses. The glasses control signal G2 may be a repeated numeric string as in the fourth embodiment.

In the display step S42, the video signal A2 is converted to a signal suitable for the display device and displayed on the display device.

The glasses control signal and frame signal are processed in the glasses as in the sixteenth embodiment. A description will be omitted.

Because of the above arrangements, the seventeenth embodiment of the invention can be controlled so that when a plurality of viewers watch the same stereoscopic video display simultaneously, they see stereoscopic video or two-dimensional video according to their individual stereoscopic viewing tolerances. In addition, even when a plurality of video data items are processed and sent to the display device simultaneously, the video data currently displayed on the display device can be controlled according to the viewers' individual stereoscopic viewing tolerances.

Those skilled in the art will recognize that further variations are possible within the scope of the invention, which is defined in the appended claims.

What is claimed is:

1. A stereoscopic video viewing limiter for use in a video viewing apparatus that permits stereoscopic video viewing by alternate display of a right-eye image and a left-eye image with parallax, comprising: a factor extraction section for extracting factor information related to a plurality of factors affecting a viewer of a stereoscopic video image from a video signal representing the stereoscopic video image; a coefficient conversion section for generating effect coefficients representing a degree of effect on the viewer from the factor information extracted by the factor extraction section; an integration section for generating integrated values by integrating the effect coefficients over a period of time during which the viewer watches the stereoscopic video image; a comparison section for comparing the integrated values with respective thresholds predetermined according to the viewer's tolerances for each of the plurality of factors and generating effect signals indicating that the integrated values have exceeded the thresholds; and a limitation determiner for generating viewing limitation signals from the effect signals according to the viewer's tolerances, the viewing limitation signals indicating a limitation of viewing to a two-dimensional video image and a cessation of viewing of the stereoscopic video image.

2. A stereoscopic video viewing limitation notifying device comprising: the stereoscopic video viewing limiter of claim 1; and an output unit for output of a warning signal based on the viewing limitation signals generated by the limitation determiner to a viewer determined to need to stop viewing the stereoscopic video image, the warning signal urging the viewer to stop viewing the stereoscopic video image and switch to viewing of the two-dimensional video image.

3. A video viewing apparatus that permits stereoscopic video viewing by alternately opening and closing a left-eye shutter and a right-eye shutter in a pair of glasses worn by a viewer to display a right-eye image and a left-eye image alternately with parallax, comprising: the stereoscopic video viewing limiter of claim 1; a decoder for generating the video signal from video data, providing the video signal as input to the stereoscopic video viewing limiter, and generating a frame signal indicating timings at which the right-eye image and the left-eye image are alternately displayed; a frame signal delayer for generating a delayed frame signal by delaying the frame signal by an amount of time equal to a duration from the input of the video signal to the stereoscopic video viewing limiter to the generation of the viewing limitation signals in the stereoscopic video viewing limiter; a transmitter for generating a control signal, based on the viewing limitation signals, indicating whether or not to allow viewing of the stereoscopic video image and transmitting the control signal together with the delayed frame signal; a video signal delayer for generating a delayed video signal by delaying the video signal by an amount of time equal to a duration from the input of the video signal to the stereoscopic video viewing limiter to the generation of the viewing limitation signals in the stereoscopic video viewing limiter; and a video output unit for output of the delayed video signal to a display device.

4. The video viewing apparatus of claim 3, wherein: the transmitter generates a plurality of control signals for respective viewers wearing respective pairs of glasses, said control signal being one of the control signals and said viewer being one of the viewers; each one of the control signals comprises a pair of numeric strings including an identifier identifying the pair of glasses worn by one of the viewers and a code indicating whether viewing of the stereoscopic video image by said pair of glasses is permitted or not; and the transmitter outputs the plurality of control signals sequentially.

5. The video viewing apparatus of claim 3, wherein when no viewer is permitted to view the stereoscopic video image, the video output unit outputs a two-dimensional video image to the display device and the transmitter outputs control signals that continuously open both the left-eye shutter and the right-eye shutter of the pair of glasses worn be each viewer.

6. A video viewing apparatus that permits stereoscopic video viewing by alternately opening and closing a left-eye shutter and a right-eye shutter of a pair of glasses worn by a viewer to display a right-eye image and a left-eye image alternately with parallax, comprising: the stereoscopic video viewing limiter of claim 1; a decoder for generating the video signal from video data, providing the video signal as input to the stereoscopic video viewing limiter, and generating a frame signal indicating timings at which the right-eye image and the left-eye image are alternately displayed; a frame signal delayer for generating a delayed frame signal by delaying the frame signal by an amount of time equal to a duration from the input of the video signal to the stereoscopic video viewing limiter to the generation of the viewing limitation signals in the stereoscopic video viewing limiter; a video signal delayer for generating a delayed video signal by delaying the video signal by an amount of time equal to a duration from the input of the video signal to the stereoscopic video viewing limiter to the generation of the viewing limitation signals in the stereoscopic video viewing limiter; and a signal output unit for generating a control signal, based on the viewing limitation signals, indicating whether or not to allow viewing of the stereoscopic video image and outputting the control signal together with the delayed frame signal and the delayed video signal to a display device.

7. The video viewing apparatus of claim 6, wherein: the transmitter generates a plurality of control signals for respective viewers wearing respective pairs of glasses, said control signal being one of the control signals and said viewer being one of the viewers; each one of the control signals comprises a pair of numeric strings including an identifier identifying the pair of glasses worn by one of the viewers and a code indicating whether viewing of the stereoscopic video image by said pair of glasses is permitted or not; the transmitter outputs the plurality of control signals sequentially.

8. The video viewing apparatus of claim 6, wherein when no viewer is permitted to view the stereoscopic video image, the video output unit outputs a two-dimensional video image to the display device and the transmitter outputs control signals that open both the left-eye shutter and the right-eye shutter of the pair of glasses worn be each viewer.

9. The video viewing apparatus of claim 3, wherein a plurality of control signals are generated and output corresponding to different viewer tolerance levels.

10. A video viewing system comprising: the video viewing apparatus of claim 3; and a pair of glasses for receiving the control signal from the transmitter in the video viewing apparatus and operating for stereoscopic viewing and two-dimensional viewing selectively.

11. A video viewing system comprising: the video viewing apparatus of claim 6; and a pair of glasses for receiving the control signal transmitted from the display device and operating for stereoscopic viewing and two-dimensional viewing selectively.

12. The video viewing system of claim 10, wherein: the pair of glasses includes a shutter controller as well as the left-eye shutter and the right-eye shutter; during viewing of the stereoscopic video image, the shutter controller opens the right-eye shutter after a timing at which display of the left-eye image is replaced by display of the right-eye image, closes the right-eye shutter before a timing at which display of the right-eye image is replaced by display of the left-eye image, opens the left-eye shutter after a timing at which display of the right-eye image is replaced by display of the left-eye image, and closes the left-eye shutter before a timing at which display of the left-eye image is replaced by display of the right-eye image; and during viewing of the two-dimensional image, the shutter controller opens the left-eye shutter and the right-eye shutter at a timing after the display of one of the right-eye image and the left-eye image begins and closes the left-eye shutter and the right-eye shutter at a timing before the display of said one of the right-eye image and the left-eye image ends, the timings at which the left-eye shutter and the right-eye shutter are opened and closed differing from the timings at which the left-eye image and the right-eye image replace each other by more during the viewing of the two-dimensional image than during the viewing of the stereoscopic video image.

13. The video viewing system of claim 10, wherein the pair of glasses displays information indicating the viewer's degree of tolerance.

14. The video viewing system of claim 10, wherein the pair of glasses has a switch for viewing of the two-dimensional image regardless of the control signal.

15. The video viewing system of claim 10, wherein the pair of pair of glasses has a switch for returning from a state in which viewing of the two-dimensional image is recommended to a state in which viewing of the stereoscopic video image is permitted.

16. A stereoscopic video viewing limitation method for use in a video viewing apparatus that permits stereoscopic video viewing by alternate display of a right-eye image and a left-eye image with parallax, comprising: a factor extraction step for extracting factor information related to a plurality of factors affecting a viewer of a stereoscopic video image from a video signal representing the stereoscopic video image; a coefficient conversion step for generating effect coefficients representing a degree of effect on the viewer from the factor information extracted by the factor extraction step; an integration step for generating integrated values by integrating the effect coefficients over a period of time during which the viewer watches the stereoscopic video image; a comparison step for comparing the integrated values with respective thresholds predetermined according to the viewer's tolerances for each of the plurality of factors and generating effect signals indicating that the integrated values have exceeded the thresholds; and a limitation determining step for generating viewing limitation signals from the effect signals according to the viewer's tolerances, the viewing limitation signals indicating a limitation of viewing to a two-dimensional video image and a cessation of viewing of the stereoscopic video image.

17. A stereoscopic video viewing limitation notifying method comprising: the stereoscopic video viewing limitation method of claim 16; and an output step for output of a warning signal based on the viewing limitation signals generated by the limitation determination step to a viewer determined to need to stop viewing the stereoscopic video image, the warning signal urging the viewer to stop viewing the stereoscopic video image and switch to viewing of the two-dimensional video image.

18. A video viewing method that permits stereoscopic video viewing by alternately opening and closing a left-eye shutter and a right-eye shutter in a pair of glasses worn by a viewer to display a right-eye image and a left-eye image alternately with parallax, comprising: the stereoscopic video viewing limitation method of claim 16; a decoding step for generating the video signal, providing the video signal as input for the stereoscopic video viewing limitation method, and generating a frame signal indicating timings at which the right-eye image and the left-eye image are alternately displayed; a transmitting step for generating a control signal, based on the viewing limitation signals, indicating whether or not to allow viewing of the stereoscopic video image and transmitting the control signal together with the delayed frame signal; and a video output step for output of the video signal to a display device; and in the pair of glasses worn by the viewer, a shutter control step for controlling the left-eye and right-eye shutters of the pair of glasses according to the control signal to permit selective viewing of the stereoscopic video image and the two-dimensional video image; wherein a plurality of control signals are generated corresponding to different viewer tolerance levels; and the left-eye and right-eye shutters of the pair of glasses are controlled according to the transmitted control signal generated according to the tolerance level of the viewer using the pair of glasses.

19. A video viewing method that permits stereoscopic video viewing by alternately opening and closing a left-eye shutter and a right-eye shutter of a pair of glasses worn by a viewer to display a right-eye image and a left-eye image alternately with parallax, comprising: the stereoscopic video image viewing limitation method of claim 16; a decoding step for generating the video signal in the stereoscopic video image viewing limitation method from video data, providing the video signal as input for the stereoscopic video image viewing limiting method, and generating a frame signal indicating timings at which the right-eye image and the left-eye image are alternately displayed; a signal output step for generating a control signal, based on the viewing limitation signals, indicating whether or not to allow viewing of the stereoscopic video image and outputting the control signal together with the frame signal and the video signal to a display device; a display step for using the video signal to create a display on the display device; a transmitting step for transmitting the control signal and the frame signal from the display device to the pair of glasses worn by the viewer; and a shutter control step for controlling the left-eye and right-eye shutters of the pair of glasses according to the control signal to permit selective viewing of the stereoscopic video image and the two-dimensional video image; wherein a plurality of control signals are generated corresponding to different viewer tolerance levels; and the left-eye and right-eye shutters of the pair of glasses are controlled according to the transmitted control signal generated according to the tolerance level of the viewer using the pair of glasses.

* * * * *